US009531069B2

(12) United States Patent
Nakasato

(10) Patent No.: US 9,531,069 B2
(45) Date of Patent: Dec. 27, 2016

(54) BASE STATION, COMMUNICATION SYSTEM, AND CONTROL METHOD FOR TRANSMISSION DIRECTIONALITY AT THE BASE STATION

(75) Inventor: Yuuki Nakasato, Ogaki (JP)

(73) Assignee: KYOCERA CORPORATION, Kyoto (JP)

(*) Notice: Subject to any disclaimer, the term of this patent is extended or adjusted under 35 U.S.C. 154(b) by 923 days.

(21) Appl. No.: 13/880,689

(22) PCT Filed: Oct. 11, 2011

(86) PCT No.: PCT/JP2011/073298
§ 371 (c)(1),
(2), (4) Date: Apr. 19, 2013

(87) PCT Pub. No.: WO2012/056871
PCT Pub. Date: May 3, 2012

(65) Prior Publication Data
US 2013/0222182 A1 Aug. 29, 2013

(30) Foreign Application Priority Data

Oct. 27, 2010 (JP) ................................. 2010-240647

(51) Int. Cl.
G01S 3/16 (2006.01)
H01Q 3/34 (2006.01)
(Continued)

(52) U.S. Cl.
CPC .............. *H01Q 3/34* (2013.01); *H04L 5/0037* (2013.01); *H04L 5/0069* (2013.01);
(Continued)

(58) Field of Classification Search
CPC ................ G01S 3/16; G01S 3/28; G01S 3/34;
H01Q 3/34; H04B 7/0617; H04B 7/086;
H04L 5/0037; H04L 5/0069; H04L
27/2613; H04W 16/28; H04W
72/046; H04J 11/033
(Continued)

(56) References Cited

U.S. PATENT DOCUMENTS 6,678,309 B1   1/2004 Kitahara
2007/0097910 A1* 5/2007 Ji ........................... H04B 7/026
370/329
(Continued)

FOREIGN PATENT DOCUMENTS

JP   2001-036465 A   2/2001
JP   2008-099079 A   4/2008
(Continued)

OTHER PUBLICATIONS

International Preliminary Report on Patentability dated Apr. 30, 2013, issued for International Application No. PCT/2011/073298.
(Continued)

*Primary Examiner* — Harry Liu
(74) *Attorney, Agent, or Firm* — Procopio Cory Hargreaves and Savitch LLP

(57) ABSTRACT

In a communication system provided with a plurality of base stations, first and second known signals are defined as known signals to be transmitted by the communication terminal. A plurality of carriers for use in transmission of the first known signal and a plurality of carriers for use in transmission of the second known signal are alternately arranged in a frequency direction in the first and second known signals in the same transmission frequency band. In each base station, at the time of transmitting a signal to a communication terminal that transmits the first known signal, the communication unit which transmits the communication terminal by use of a plurality of antennas performs
(Continued)

null-steering in relation to transmission directivity at the plurality of antennas based on the first known signal from the communication terminal.

12 Claims, 26 Drawing Sheets

(51) Int. Cl.
    *H04L 27/26*     (2006.01)
    *H04L 5/00*     (2006.01)
    *H04B 7/06*     (2006.01)
    *H04J 11/00*     (2006.01)
    *H04W 16/28*     (2009.01)
    *H04W 72/04*     (2009.01)
    *H04B 7/08*     (2006.01)

(52) U.S. Cl.
    CPC ........ *H04L 27/2613* (2013.01); *H04B 7/0617* (2013.01); *H04B 7/086* (2013.01); *H04J 11/003* (2013.01); *H04W 16/28* (2013.01); *H04W 72/046* (2013.01)

(58) Field of Classification Search
    USPC ........................................................ 342/379
    See application file for complete search history.

(56) References Cited

U.S. PATENT DOCUMENTS

| | | | | |
|---|---|---|---|---|
| 2007/0206528 | A1* | 9/2007 | Walton | H04W 74/0808 370/328 |
| 2008/0267063 | A1* | 10/2008 | Trigui | H04B 7/0408 370/229 |
| 2008/0273515 | A1 | 11/2008 | Stopler et al. | |
| 2010/0227646 | A1* | 9/2010 | Ogawa | H01Q 1/246 455/562.1 |
| 2011/0019573 | A1* | 1/2011 | Ezri | H04W 24/10 370/252 |
| 2011/0077017 | A1* | 3/2011 | Yu | H04L 5/0007 455/452.1 |
| 2011/0149778 | A1* | 6/2011 | Yu | H04W 52/241 370/252 |
| 2011/0170482 | A1* | 7/2011 | Dhanda | H04L 5/0048 370/328 |

FOREIGN PATENT DOCUMENTS

| | | |
|---|---|---|
| JP | 2009-033717 A | 2/2009 |
| JP | 2010-154239 A | 7/2010 |
| WO | 2009/046318 A2 | 4/2009 |

OTHER PUBLICATIONS

International Search Report dated Dec. 6, 2011, issued for International Application No. PCT/JP2011/073298.

* cited by examiner

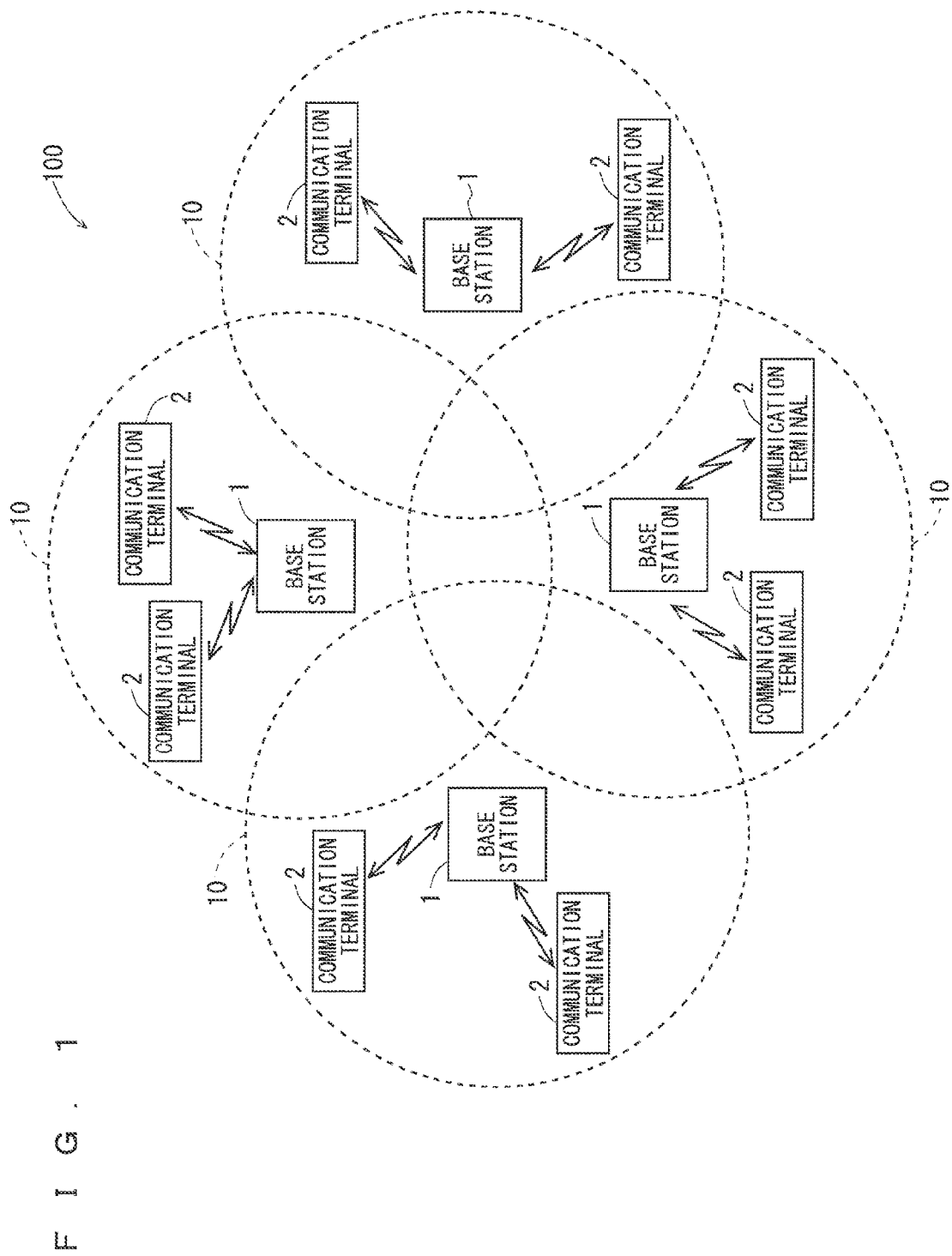
F I G . 1

F I G. 2
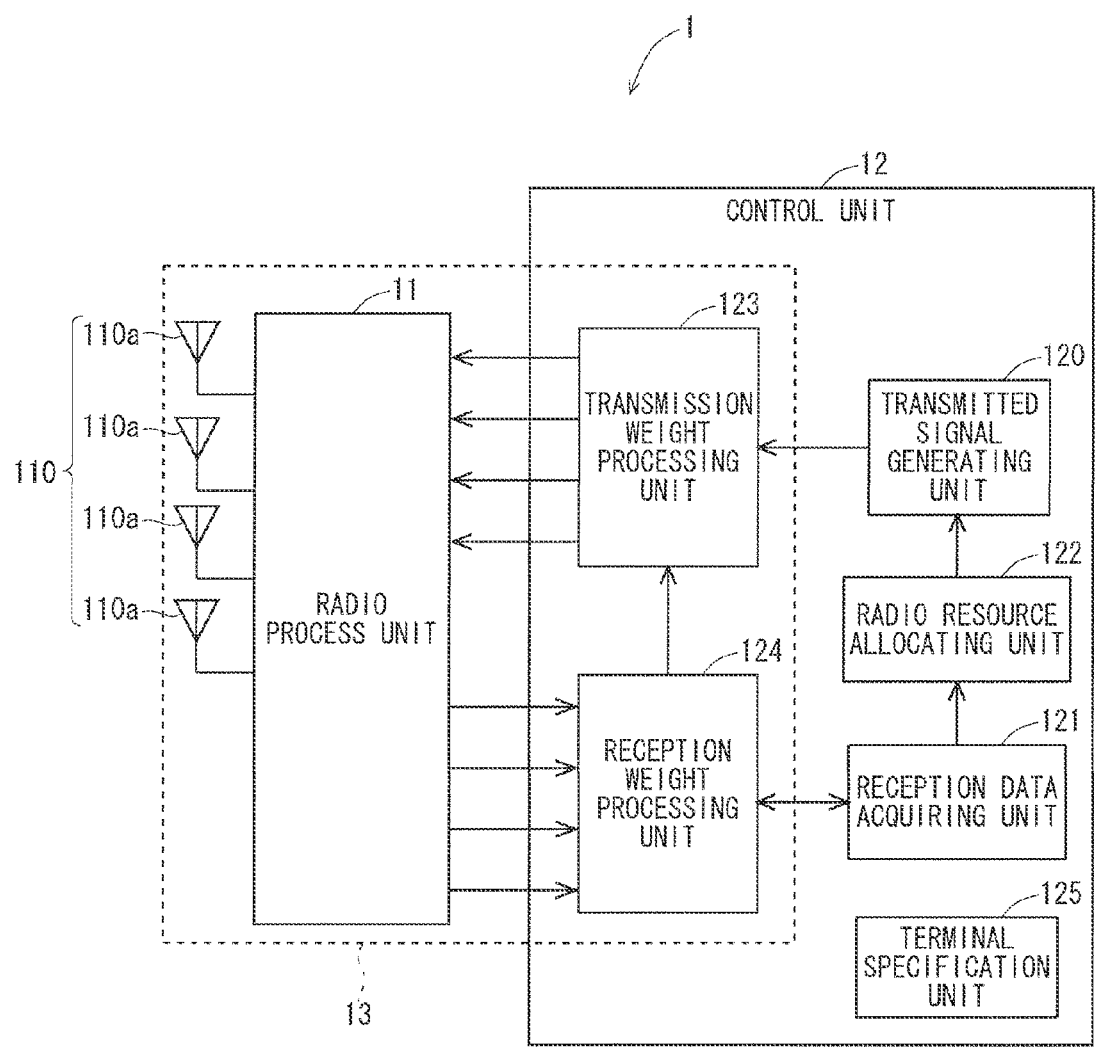

F I G . 4

| CONSTITUTION NUMBER | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

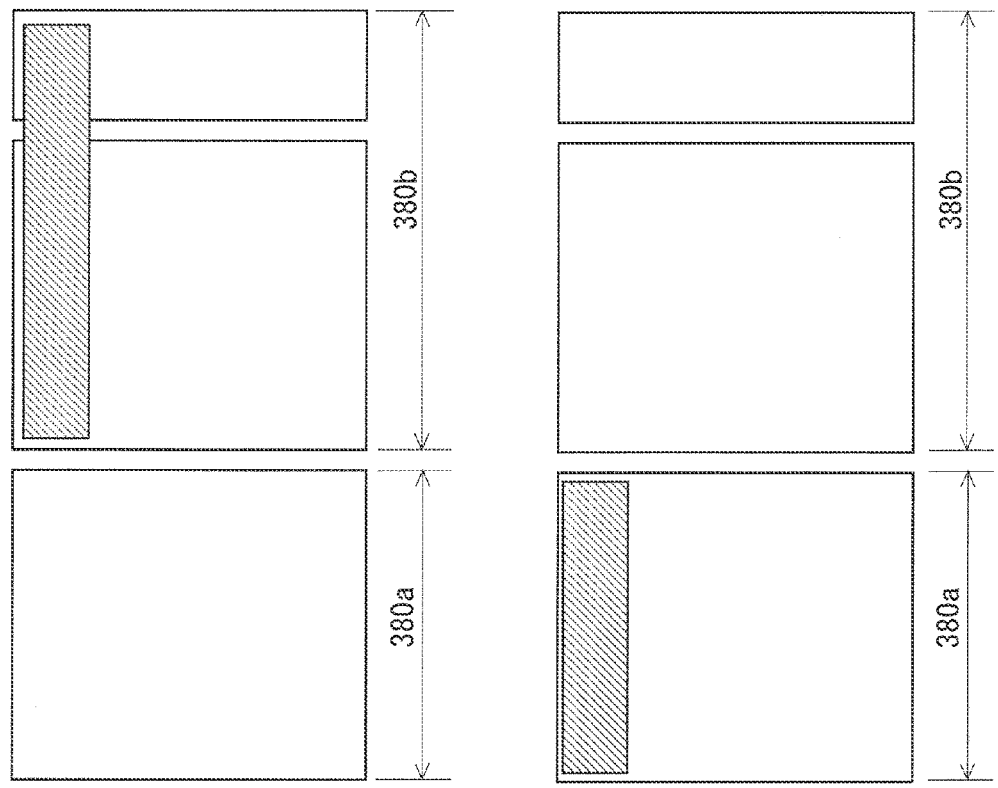
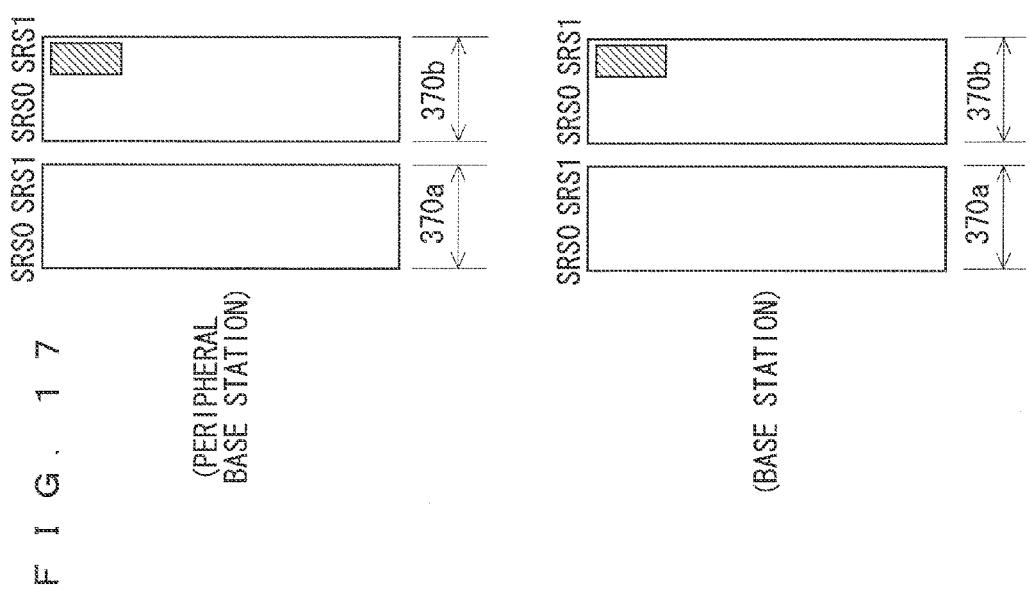
FIG. 17

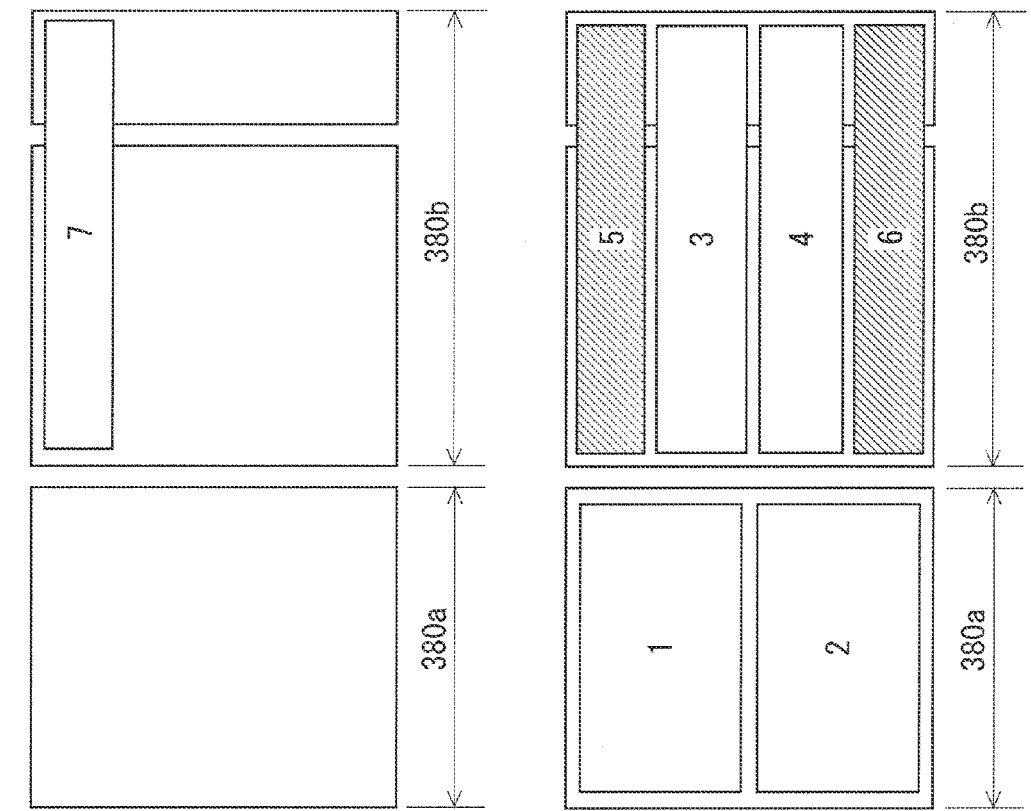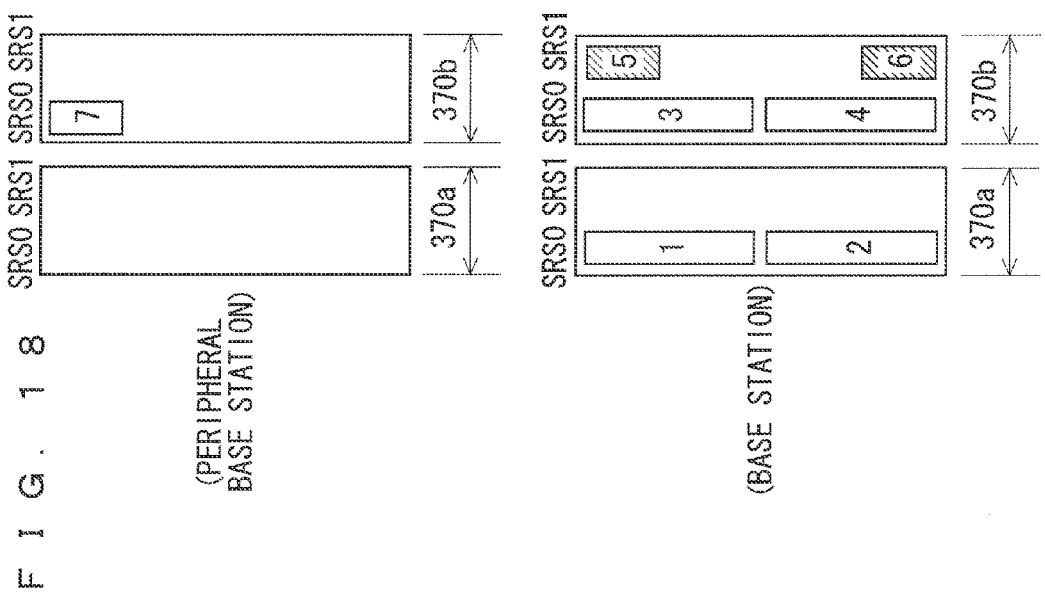
FIG. 18

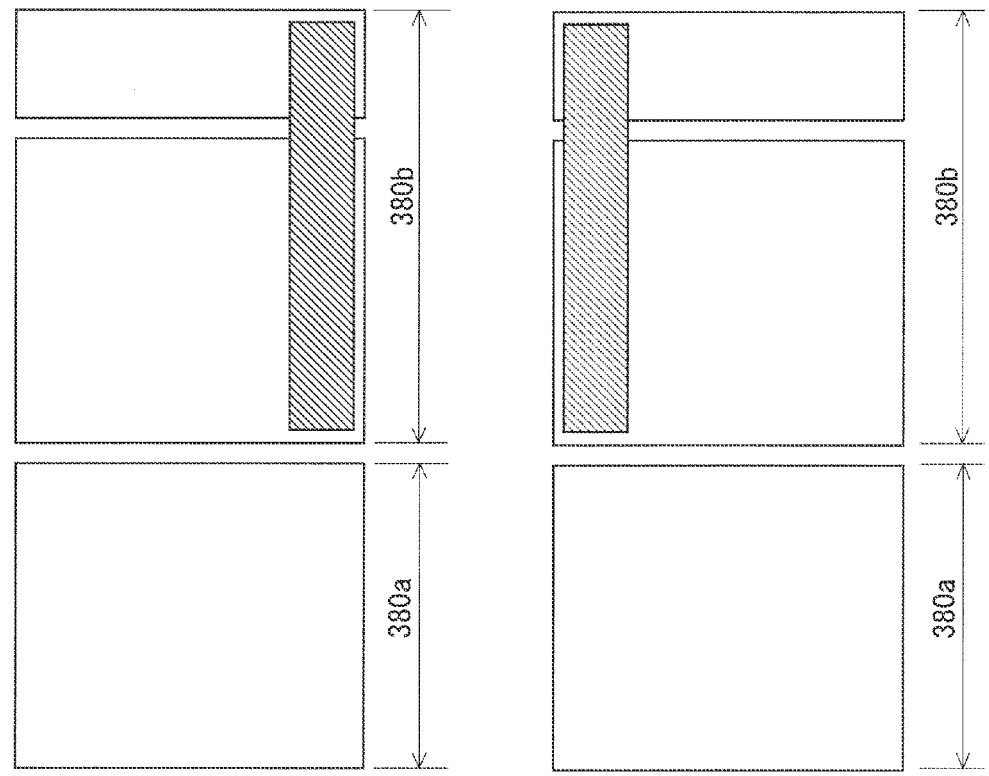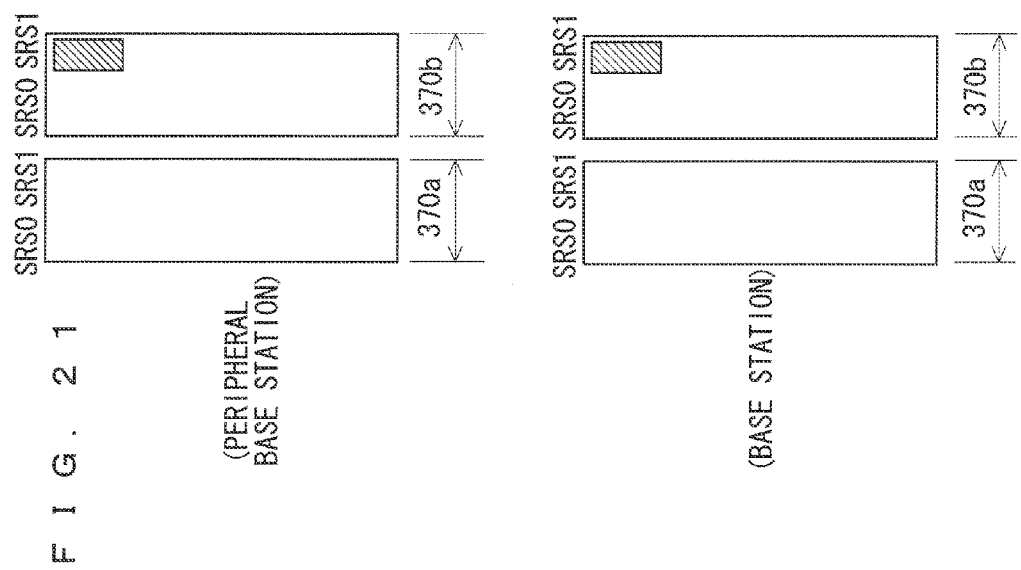
FIG. 21

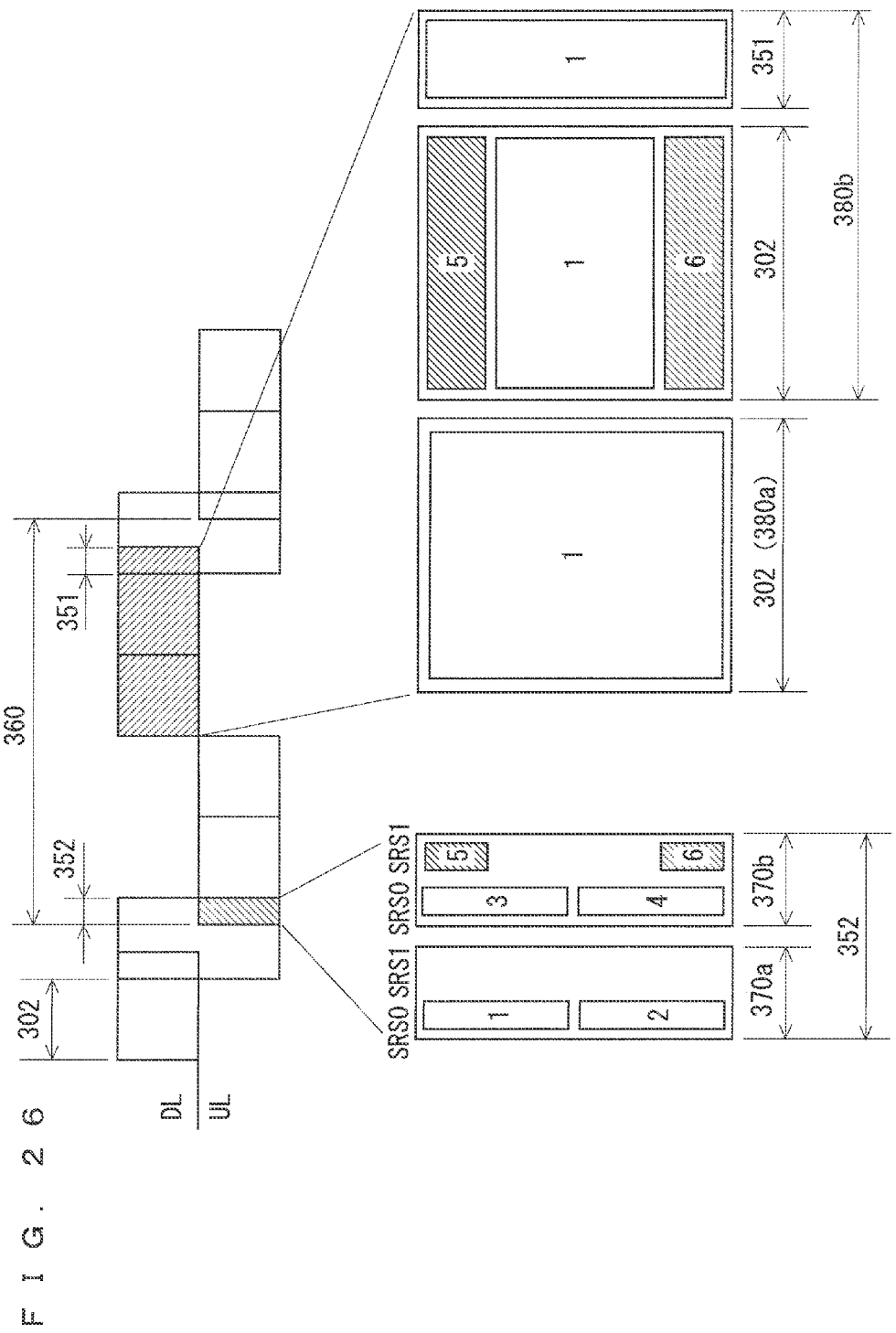
F I G. 26

BASE STATION, COMMUNICATION SYSTEM, AND CONTROL METHOD FOR TRANSMISSION DIRECTIONALITY AT THE BASE STATION

TECHNICAL FIELD

The present invention relates to control of transmission directivity at a base station.

BACKGROUND ART

There have hitherto been proposed a variety of techniques in relation to radio communications. For example, in Patent Document 1, a technique in relation to LTE (Long Term Evolution) is disclosed. LTE is also called "E-UTRA".

PRIOR ART DOCUMENT

Patent Document

Patent Document 1: Japanese Patent Application Laid-Open No. 2008-099079

SUMMARY OF THE INVENTION

Problems to be Solved by the Invention

In a communication system such as LTE, an adaptive array antenna system for adaptively controlling directionality at an array antenna made up of a plurality of antennas may be adopted. At the time of the base station transmitting a signal to a communication terminal by use of an adaptive array antenna system, for the purpose of suppressing interference with the communication terminal communicating with a peripheral base station, null-steering is performed in relation to transmission directivity at an array antenna so as to direct a null to the communication terminal. In the null-steering, since the number of settable nulls depends of the number of a plurality of antennas constituting an array antenna, when the number of communication terminals to communicate with a peripheral base station is large, it may not be able to direct a null to a communication terminal, to which a null needs to be directed.

Thereat, the present invention was made in light of the foregoing respect, and has an object to provide a technique capable of reliably directing a null to a communication terminal, to which a null needs to be directed.

Means for Solving the Problems

A base station according to one aspect is one base station in a communication system provided with a plurality of base stations, including: a communication unit for communicating with a communication terminal by use of a plurality of antennas; and a generation unit for generating a signal transmitted from the communication unit, wherein first and second known signals are defined as known signals to be transmitted by the communication terminal in the communication system, a plurality of carriers for use in transmission of the first known signal and a plurality of carriers for use in transmission of the second known signal are alternately arranged in a frequency direction in the first and second known signals in the same transmission frequency band, at the time of transmitting a signal to a communication terminal that transmits the first known signal, the communication unit performs null-steering in relation to transmission directivity at the plurality of antennas based on the first known signal from the communication terminal.

Further, a base station according to one aspect is one base station that communicates with a communication terminal, including: a communication unit for communicating with a communication terminal by use of a plurality of antennas; and a specification unit for specifying a long-distance terminal which is a communication terminal that communicates with its base station and exists in a position distant from its base station, wherein in the base station, when the communication unit transmits a signal to the long-distance terminal specified in the specification unit with performing null-steering in relation to transmission directivity at the plurality of antennas, a null is directed to a communication terminal that communicates with a peripheral base station and exists in a position distant from the peripheral base station, and a null is not directed to a communication terminal that communicates with a peripheral base station and exists in a position close to the peripheral base station.

Further, a communication system according to one aspect is a communication system including a plurality of base stations, wherein each of the plurality of base stations is provided with a communication unit for communicating with a communication terminal by use of a plurality of antennas, first and second known signals are defined as known signals to be transmitted by the communication terminal in the communication system, a plurality of carriers for use in transmission of the first known signal and a plurality of carriers for use in transmission of the second known signal are alternately arranged in a frequency direction in the first and second known signals in the same transmission frequency band, in each of the plurality of base stations, at the time of transmitting a signal to a communication terminal that transmits the first known signal, and the communication unit performs null-steering in relation to transmission directivity at the plurality of antennas based on the first known signal from the communication terminal.

Further, a communication system according to one aspect is a communication system including a plurality of base stations, wherein each of the plurality of base stations is provided with a communication unit for communicating with a communication terminal by use of a plurality of antennas, and a specification unit for specifying a long-distance terminal which is a communication terminal that communicates with its base station and exists in a position distant from its base station, while specifying a short-distance terminal which is a communication terminal that communicates with its base station and exists in a position close to its base station, and in each of the plurality of base stations, when the communication unit transmits a signal to the long-distance terminal specified in the specification unit with performing null-steering in relation to transmission directionality at the plurality of antennas, a null is directed to the long-distance terminal specified in a peripheral base station and a null is not directed to the short-distance terminal specified in a peripheral base station.

Further, a control method for transmission directivity at a base station according to one aspect is a control method for transmission directivity at one base station in a communication system provided with a plurality of base stations, the method including the steps of: (a) communicating with a communication terminal by use of a plurality of antennas; and (b) generating a signal transmitted in the step (a), wherein first and second known signals are defined as known signals to be transmitted by the communication terminal in the communication system, a plurality of carriers for use in transmission of the first known signal and a plurality of carriers for use in transmission of the second known signal are alternately arranged in a frequency direction in the first and second known signals in the same transmission frequency band, and in the step (a), at the time of transmitting a signal to a communication terminal that transmits the first known signal, null-steering is performed in relation to transmission directivity at the plurality of antennas based on the first known signal from the communication terminal.

Further, a control method for transmission directivity at a base station according to one aspect is a control method for transmission directivity at a base station that communicates with a communication terminal, the method including the steps of: (a) communicating with a communication terminal by use of a plurality of antennas; and (b) specifying a long-distance terminal which is a communication terminal that communicates with its base station and exists in a position distant from its base station, wherein in the step (a), when a signal is transmitted to the long-distance terminal specified in the step (b) with null-steering being performed in relation to transmission directionality at the plurality of antennas, a null is directed to a communication terminal that communicates with a peripheral base station and exists in a position distant from the peripheral base station, and a null is not directed to a communication terminal that communicates with a peripheral base station and exists in a position close to the peripheral base station.

Effects of the Invention

It is possible to reliably direct a null to a communication terminal, to which a null needs to be directed.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram showing a configuration of a communication system.
FIG. 2 is a diagram showing a configuration of a base station.
FIG. 4 is a diagram showing kinds of configurations of the TDD frame.
FIG. 17 is a diagram showing an example of allocating the downlink radio resource to the communication terminal.
FIG. 18 is a diagram showing an example of allocating the downlink radio resource to the communication terminal.
FIG. 21 is a diagram showing an example of allocating the downlink radio resource to the communication terminal.
FIG. 26 is a diagram showing an example of allocating the downlink radio resource to the communication terminal.

EMBODIMENT FOR CARRYING OUT THE INVENTION

Figure 3:
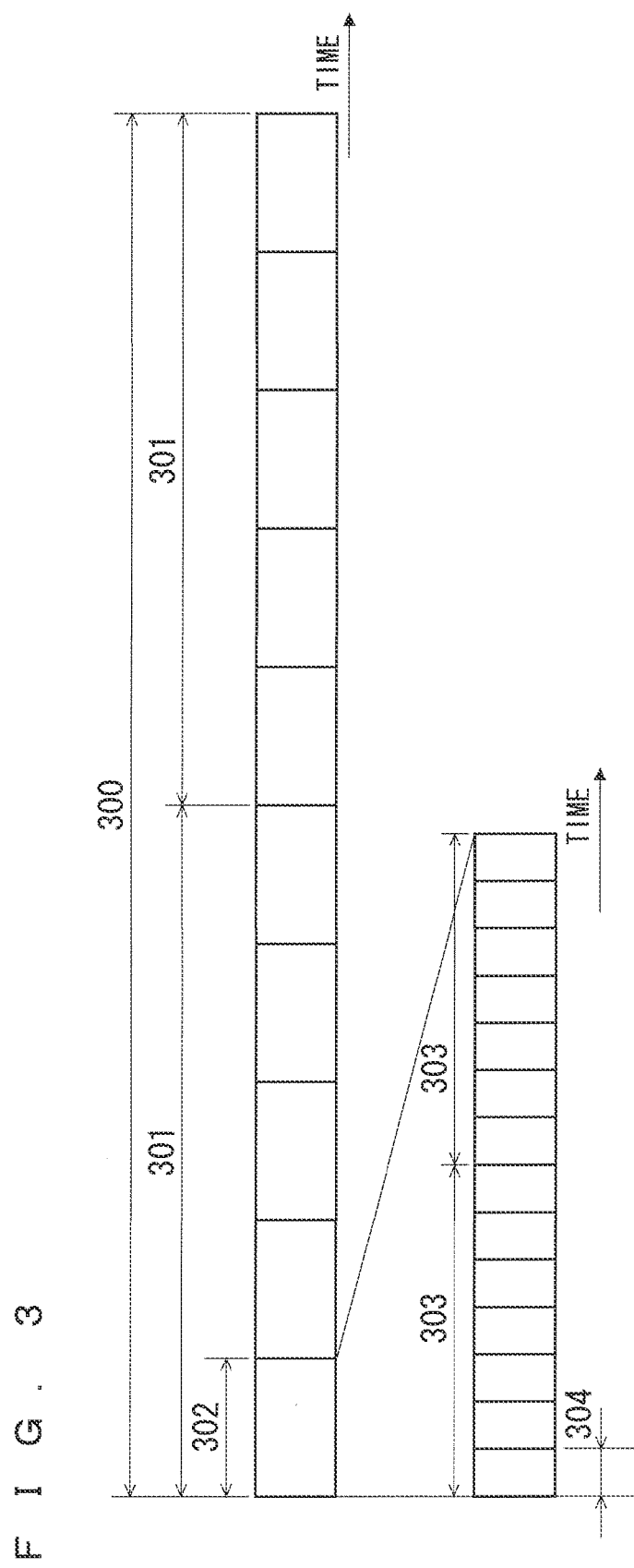
FIG. 3 is a diagram showing a configuration of a TDD frame.

FIG. 1 is a diagram showing a configuration of a communication system 100 according to the present embodiment. The communication system 100 is, for example, LTE adopted with a TDD (Time Division Duplexing) scheme as a duplex scheme, and includes a plurality of base stations 1. The respective base stations 1 communicate with a plurality of communication terminals 2. In LTE, an OFDMA (Orthogonal Frequency Division Multiple Access) scheme is used for downlink communication, and an SC-FDMA (Single Carrier-Frequency Division Multiple Access) scheme is used for uplink communication. Therefore, the OFDMA scheme is used for transmission from the base station 1 to the communication terminal 2, and the SC-FDMA scheme is used for transmission from the communication terminal 2 to the base station 1. In the OFDMA scheme, an OFDM (Orthogonal Frequency Division Multiplexing) signal, formed by synthesizing a plurality of mutually orthogonal subcarriers, is used.

As shown in FIG. 1, a service area 10 of each base station 1 is partially superimposed on service areas 10 of peripheral base stations 1. In FIG. 1, only two or three peripheral base stations 1 exist with respect to one base station 1 due to only four base stations 1 being shown, but in practice, six peripheral base stations 1, for example, exist with respect to one base station 1.

The plurality of base stations 1 are connected to a network, not shown, and are communicable with one another through the network. Further, a server, not shown, is connected to the network, and each base station 1 is communicable with the server through the network.

FIG. 2 is a diagram showing a configuration of each base station 1. Each base station 1 can simultaneously communicate with a plurality of communication terminals 2 by individually allocating a radio resource specified by a two dimension made up of a time axis and a frequency axis, to each of the plurality of communication terminals 2. Each base station 1 has an array antenna as a transmission/reception antenna, and directionality at the array antenna can be controlled, using an adaptive array antenna system.

As shown in FIG. 2, the base station 1 is provided with a radio process unit 11, and a control unit 12 for controlling the radio process unit 11. The radio process unit 11 has an array antenna 110 made up of a plurality of antennas 110*a*. The radio process unit 11 performs an amplification process, a down-conversion process, an A/D conversion process and the like on each of a plurality of received signals that are received in the array antenna 110, to generate a plurality of baseband received signals, and outputs the signals.

Further, the radio process unit 11 performs a D/A conversion process, an up-conversion process, an amplification process and the like on each of a plurality of baseband transmitted signals that are generated in the control unit 12, to generate a plurality of carrierband transmitted signals. Then, the radio process unit 11 inputs the generated plurality of carrierband transmitted signals to the plurality of antennas 110*a* constituting the array antenna 110, respectively. Thereby, the transmitted signal is radio-transmitted from each antenna 110*a*.

The control unit 12 is made up of a CPU (Central Processing Unit), a DSP (Digital Signal Processor), a memory and the like. In the control unit 12, the CPU and the DSP execute a variety of programs in the memory, thereby to form a plurality of functional blocks such as a transmitted signal generating unit 120, a reception data acquiring unit 121, a radio resource allocating unit 122, a transmission weight processing unit 123, a reception weight processing unit 124 and a terminal specification unit 125.

The transmitted signal generating unit 120 generates transmitted data to be transmitted to the communication terminal 2 as a communication subject. The transmitted signal generating unit 120 then generates a baseband transmitted signal including the generated transmitted data. The transmitted signals are generated just in number corresponding to the number of plurality of antennas 110*a* constituting the array antenna 110.

The transmission weight processing unit 123 respectively sets a plurality of transmission weights for controlling transmission directivity at the array antenna 110 to a plurality of transmitted signals generated in the transmitted signal generating unit 120. The transmission weight processing unit 123 then performs inverse discrete Fourier transform (IDFT) or the like on the plurality of transmitted signals respectively set with the plurality of transmission weights, and thereafter outputs the plurality of transmitted signals to the radio process unit 11.

The reception weight processing unit 124 performs discrete Fourier transform (DFT) on the plurality of received signals inputted from the radio process unit 11, and thereafter sets a plurality of reception weights for controlling reception directionality at the array antenna 110, respectively. The reception weight processing unit 124 then synthesizes the plurality of received signals respectively set with the plurality of reception weights, to generate a new received signal.

The reception data acquiring unit 121 performs inverse discrete Fourier transform, a demodulation process and the like on the new received signal generated in the reception weight processing unit 124, to acquire control data, user data and the like included in the received signal.

In the base station 1 according to the present embodiment, a communication unit 13 is configured which communicates with a plurality of communication terminals 2 while adaptively controlling the directionality at the array antenna 110 by the radio process unit 11, the transmission weight processing unit 123 and the reception weight processing unit 124. The communication unit 13 respectively controls the reception directionality and the transmission directivity at the array antenna 110 when communicating with the communication terminal 2. Specifically, the communication unit 13 adjusts a reception weight, by which the received signal is multiplied, in the reception weight processing unit 124 and can thus set a beam or a null of the reception directionality at the array antenna 110 in a variety of directions. Further, the communication unit 13 adjusts a transmission weight, by which the transmitted signal is multiplied, in the transmission weight processing unit 123 and can thus set a beam or a null of the transmission directivity at the array antenna 110 in a variety of directions. The transmission weight can be obtained from the reception weight, and the reception weight can be obtained based on a known signal from the communication terminal 2.

The radio resource allocating unit 122 allocates, to each communication terminal 2 as the communication subject, a downlink radio resource (transmission frequency and transmission time band) for use in transmission to the communication terminal 2. Based on the downlink radio resource allocated to the communication terminal 2 by the radio resource allocating unit 122, the transmitted signal generating unit 120 generates a transmitted signal for the communication terminal 2, while inputting the transmitted signal into the transmission weight processing unit 123 in the timing based on the downlink radio resource. This leads to transmission of the transmitted signal for the communication terminal 2 from the communication unit 13 by use of the downlink radio resource allocated to the communication terminal 2.

Further, the radio resource allocating unit 122 allocates, to each communication terminal 2 as the communication subject, an uplink radio resource that is used at the time of transmission of the communication terminal 2 to the base station 1. The transmitted signal generating unit 120 generates a transmitted signal for notifying the communication terminal 2 of the uplink radio resource allocated to the communication terminal 2 by the radio resource allocating unit 122, and outputs the signal. This allows the communication terminal 2 to know the uplink radio resource for use in transmission to the base station 1, and transmit the signal to the base station 1 by use of the uplink radio resource.

The terminal specification unit 125 specifies the communication terminal 2 that communicate with its base station 1 and that exists in a position distant from its base station 1. The communication terminal 2 that exists in a position distant from the base station 1 is referred to as a "long-distance terminal 2". Further, the terminal specification unit 125 specifies the communication terminal 2 that communicate with its base station 1 and that exists in a position close to its base station 1. The communication terminal 2 that exists in a position close to the base station 1 is referred to as a "short-distance terminal 2".

The terminal specification unit 125 according to the present embodiment, for example, estimates a distance L between its base station 1 and the communication terminal 2 communicating with its base station 1. Then, when the distance L concerning the communication terminal 2 that communicates with its base station 1 is longer than a threshold L0, the terminal specification unit 125 regards the communication terminal 2 as the long-distance terminal 2. Meanwhile, when the distance L concerning the communication terminal 2 that communicates with the base station 1 is not longer than a threshold L0, the terminal specification unit 125 then regards the communication terminal 2 as the short-distance terminal 2.

As for a method for estimating the distance L, a variety of method can be considered. As a first example, in the case of the base station 1 controlling transmitted electric power of the communication terminal 2, the terminal specification unit 125 may estimate the distance L between the communication terminal 2 and its base station 1 based on transmitted electric power directed by the base station 1 to the communication terminal 2 and received electric power concerning a received signal received from the communication terminal 2.

As a second example, the terminal specification unit 125 may calculate an amount of deviation between reception timing at its base station 1 for a transmitted signal from the communication terminal 2 and an ideal reception timing for the transmitted signal, to estimate the distance L between the communication terminal 2 and its base station 1 based on the amount of deviation.

As a third example, with a GPS receiver or the like mounted in the communication terminal 2, in the case of the communication terminal 2 notifying the base station 1 of positional information indicating the position of the communication terminal 2, the terminal specification unit 125 may estimate the distance L between the communication terminal 2 and its base station 1 based on the positional information on the communication terminal 2 notified from the communication terminal 2 and previously stored positional information indicating the position of its base station 1.

It is to be noted that the long-distance terminal 2 and the short-distance terminal 2 may be specified without estimating the distance L. For example in the above first example, when an absolute value of a difference between the transmitted electric power directed by the base station 1 to the communication terminal 2 and the received signal received from the communication terminal 2 is larger than a threshold, the terminal specification unit 125 determines that the communication terminal 2 is the long-distance terminal 2, and when it is not larger than the threshold, it is determined that the communication terminal 2 is the short-distance terminal 2.

Further in the above second example, when the amount of deviation is larger than the threshold, the terminal specification unit 125 determines that the communication terminal 2 is the long-distance terminal 2, and when it is not larger than the threshold, it is determined that the communication terminal 2 is the short-distance terminal 2.

Moreover, the more distant the communication terminal 2 communicating with the base station 1 gets from the base station 1, the closer it gets to the peripheral base station 1, and hence the communication terminal 2 distant from the base station 1 gets susceptible to interference by the transmitted signal of the peripheral base station 1. Accordingly, in the communication terminal 2 distant from the base station 1, reception quality with respect to the transmitted signal of the base station 1 deteriorates. Hence in the case of the communication terminal 2 notifying the base station 1 of reception quality information indicating reception quality with respect to a transmitted signal of the base station 1 as the communication subject as CQI (Channel Quality Indicator), the terminal specification unit 125 determines the communication terminal 2 is the long-distance terminal 2 when reception quality indicated by reception quality information notified from the communication terminal 2 does not satisfy a predetermined standard, and it is determined that the communication terminal 2 is the short-distance terminal 2 when it satisfies the predetermined standard.

<Configuration of TDD Frame>

Next, a TDD frame 300 used between the base station 1 and the communication terminal 2 will be described. The TDD frame 300 is specified by a two dimension made up of a time axis and a frequency axis. A frequency bandwidth (system bandwidth) of the TDD frame 300 is, for example, 20 MHz and a time length of the TDD frame 300 is 10 ms. From the TDD frame 300, the base station 1 decides an uplink radio resource and a downlink radio resource to be allocated to each communication terminal 2.

FIG. 3 is a diagram showing a configuration of the TDD frame 300. As shown in FIG. 3, the TDD frame 300 is made up of two half frames 301. Each half frame 301 is configured of five subframes 302. That is, the TDD frame 300 is configured of ten subframes 302. The subframe 302 has a time length of 1 ms. Hereinafter, the ten subframes 302 constituting the TDD frame 300 may be referred to as zeroth to ninth subframes 302 sequentially from the top.

Each subframe 302 is configured of two slots 303 in the time direction. Each slot 303 is configured of seven symbol periods 304. Accordingly, each subframe 302 contains fourteen symbol periods 304 in the time direction. This symbol period 304 is one symbol period of an OFDM symbol in the OFDMA scheme downlink, and is one symbol period of a DFTS (Discrete Fourier Transform Spread)—OFDM symbol in the SC-FDMA scheme uplink.

The TDD frame 300 configured as above contains at least one uplink-specific subframe 302 and at least two downlink-specific subframes 302. Hereinafter, the uplink-specific subframe 302 is referred to as an "uplink subframe 302", and the downlink-specific subframe 302 is referred to as a "downlink subframe 302".

In LTE, in the TDD frame 300, a region (radio resource) including a frequency bandwidth of 180 kHz in the frequency direction and a seven symbol periods 304 (one slot 303) in the time direction is called a "resource block (RB). The resource block contains 12 subcarriers. Allocation of the uplink radio resource and the downlink radio resource to the communication terminal 2 in the radio resource allocating unit 122 is performed by units of one resource block. It is to be noted that, since the SC-FDMA scheme is used for the uplink, when a plurality of resource blocks are allocated to some communication terminal 2 in one slot 303 of the uplink subframe 302, a plurality of resource blocks continued in the frequency direction are allocated to the communication terminal 2.

Further, in LTE, as for the configuration of the TDD frame 300, seven kinds of configurations in different combinations of the uplink subframe 302 and the downlink subframe 302 are defined. FIG. 4 is a diagram showing the seven kinds of configurations.

As shown in FIG. 4, in LTE, configurations of the 0th to sixth TDD frames 300 are defined. In the present communication system 100, one configuration out of these seven kinds of configurations is used. In FIG. 4, the subframe 302 indicated by "D" represents the downlink subframe 302, and the subframe 302 indicated by "U" represents the uplink subframe 302. Further, the subframe 302 indicated by "S" represents the subframe 302 in which a switch from downlink to uplink is made in the communication system 100. This subframe 302 is referred to as a "special subframe 302".

In the TDD frame 300 having the configuration of No. 0, the zeroth and fifth subframes 302 are the downlink subframes 302, the second to fourth subframes 302 and seventh to ninth subframes 302 are the uplink subframes 302, and the first and sixth subframes 302 are the special subframes 302. Further, in the TDD frame 300 having the configuration of No. 4, the zeroth subframe 302 and the fourth to ninth subframes 302 are the downlink subframes 302, the second and third subframes 302 are the uplink subframes 302, and the first downlink subframe 302 is the special subframe 302.

Figure 5:
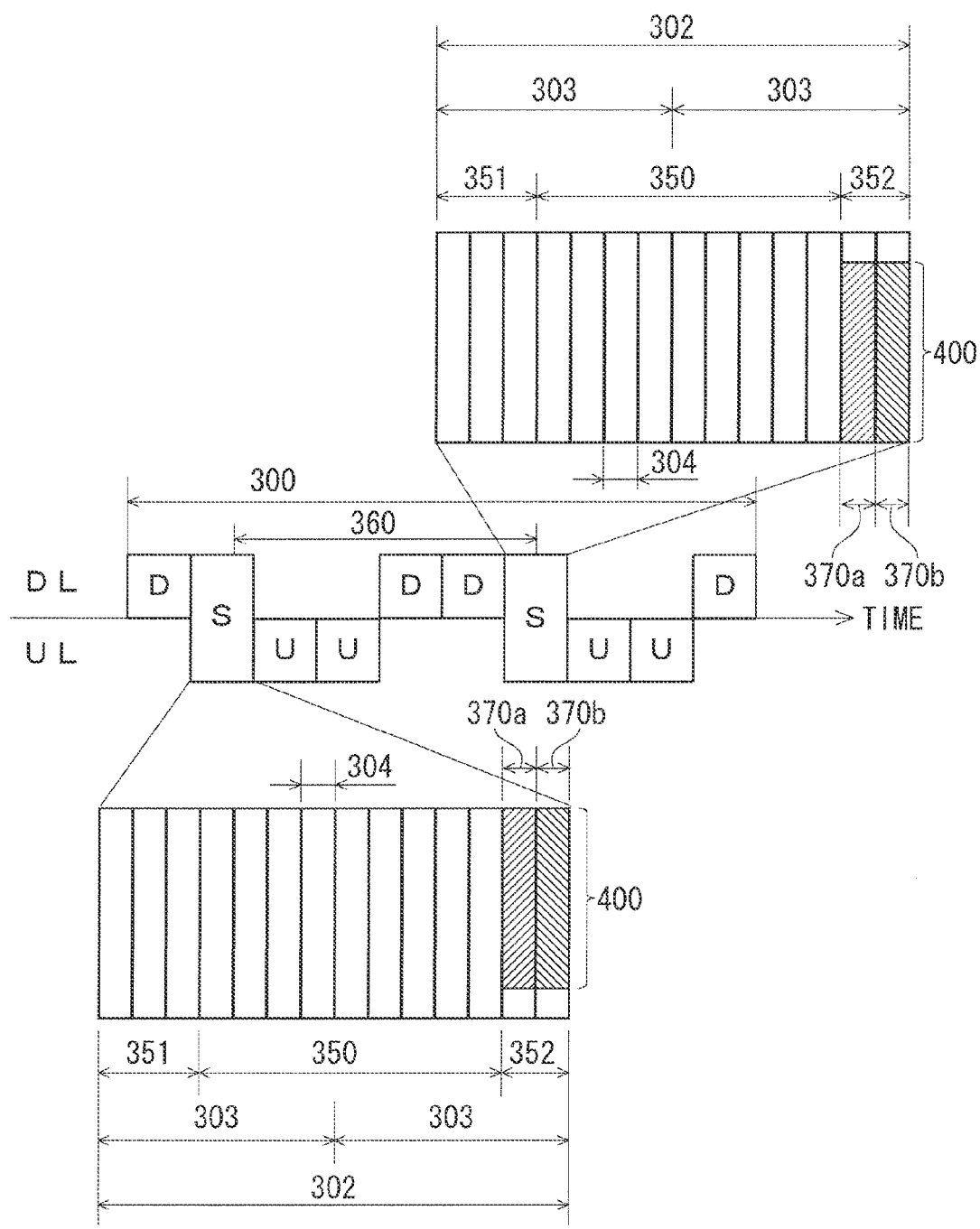
FIG. 5 is a diagram showing a detail of the configuration of the TDD frame.

FIG. 5 is a diagram showing in detail the configuration of the TDD frame 300 having the configuration of No. 1. As shown in FIG. 5, the special subframe 302 contains in the time direction a downlink pilot time slot (DwPTS) 351, a guard period (GP) 350, and an uplink pilot time slot (UpPTS) 352. The guard period 350 is a no-signal period necessary for switching from downlink to uplink, and is not used for communication. In the following description, it is assumed that the TDD frame 300 having the configuration of No. 1 is used in the communication system 100.

In LTE, as for the combination in time length among the down pilot time slot 351, the guard period 350 and the uplink pilot time slot 352, a plurality of kinds of combinations are defined. In the example of FIG. 5, a time length of the downlink pilot time slot 351 has been set to three symbol periods 304, and a time length of the uplink pilot time slot 352 has been set to two symbol periods 304.

In the communication system 100 according to the present embodiment, downlink communication can be performed not only in the downlink subframe 302, but also in the downlink pilot time slot 351 of the special subframe 302. Further, in the present communication system 100, uplink communication can be performed not only in the uplink subframe 302, but also in the uplink pilot time slot 352 of the special subframe 302.

In the present embodiment, the base station 1 transmits data to the communication terminal 2 in each symbol period 304 of the downlink pilot time slot 351. Further, the communication terminal 2 transmits a known signal called "sounding reference signal (SRS)" in the symbol period 304 included in the uplink pilot time slot 352. The SRS is configured of a plurality of complex symbols that modulate a plurality of subcarriers. In LTE, the SRS is often used at the time of estimating uplink quality, but in the present embodiment, the SRS transmitted in the uplink pilot time slot 352 is used for calculating a transmission weight. That is, the base station 1 controls the transmission directivity in the array antenna 110 based on the SRS transmitted by the communication terminal 2 in the uplink pilot time slot 352.

It should be noted that the SRS is also transmittable in the last symbol period 304 of the uplink subframe 302. Hereinafter, the SRS means the SRS transmitted using the uplink pilot time slot 352, unless otherwise specified.

Further, in the present embodiment, since the SRS is transmitted to every uplink pilot time slot 352 of the special subframe 302, a period from the beginning of the uplink pilot time slot 352 of the special subframe 302 to the uplink pilot time slot 352 of the subsequent special subframe 302 is called an "SRS transmission period 360".

Moreover, the beginning of the symbol period 304 of the uplink pilot time slot 352 is referred to as a "first SRS transmission symbol period 370a", and the end symbol period 304 of the uplink pilot time slot 352 is referred to as a "second SRS transmission symbol period 370b". When distinguishing between the first and second SRS transmission symbol period is not necessarily required, each of them is referred to as an "SRS transmission symbol period 370". In the present embodiment, each communication terminal 2 transmits an SRS in at least one of the first SRS transmission symbol period 370a and the second SRS transmission symbol period 370b in each special subframe 302 (in every SRS transmission period 360).

<Transmission Frequency Band of SRS>

In LTE, at the time of transmitting an SRS, the entire area of the system band cannot be used. Specifically, either the low-frequency-side end or the high-frequency-side end of the system band cannot be used. That is, the frequency band usable for transmission of an SRS in the system band is either arranged to the high frequency side or arranged to the low frequency side. Hereinafter, the usable frequency band for SRS transmission is referred to as an "SRS transmittable band 400". In FIG. 5, the SRS transmittable band 400 is indicated by diagonal lines.

As shown in FIG. 5, in the present communication system 100, the special subframe 302, in which the frequency band 400 is arranged to the high frequency side of the system band in each of the first SRS transmission symbol period 370a and the second SRS transmission symbol period 370b, and the special subframe 302, in which the SRS transmittable band 400 is arranged to the low frequency side of the system band in each of the first SRS transmission symbol period 370a and the second SRS transmission symbol period 370b, alternately appear. That is, the SRS transmittable band 400 is alternately arranged on the high frequency side or the low frequency side of the system band in every SRS transmission period 360.

Further, in the communication system 100 according to the present embodiment, a frequency band that is used by one communication terminal 2 for transmission of the SRS (hereinafter referred to as "SRS transmission band") changes in every special subframe 302 (in every SRS transmission period 360) within the SRS transmittable band 400. Then by one communication terminal 2 transmitting the SRS a plurality of times, the SRS is transmitted over the entire band of the SRS transmittable band 400. This operation is called "frequency hopping".

Figure 6:
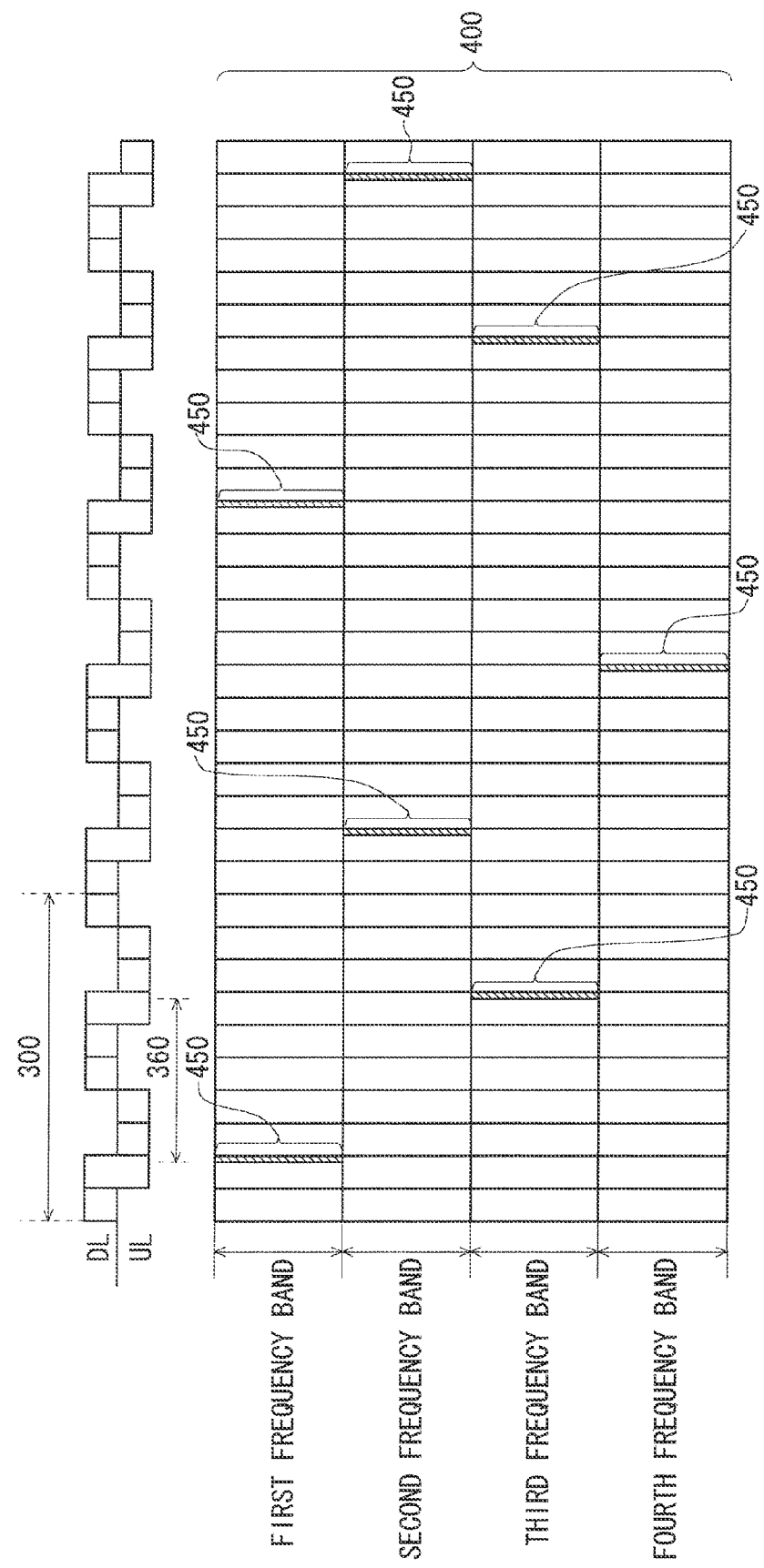
FIG. 6 is a diagram showing a state where an SRS transmission band is subjected to frequency hopping.

FIG. 6 is a diagram showing one example of states where an SRS transmission band 450 used by some communication terminal 2 performs frequency hopping. In the example of FIG. 6, the SRS transmittable band 400 is divided into first to fourth frequency bands. The SRS transmission band 450 with a bandwidth being a quarter of the bandwidth of the SRS transmittable band 400 sequentially changes to the first frequency band, the third frequency band, the second frequency band and the fourth frequency band in every SRS transmission period 360. It should be noted that the SRS transmission band 450 in the first SRS transmission symbol period 370a and the SRS transmission band 450 in the second SRS transmission symbol period 370b perform frequency hopping independently from each other.

<Configuration of SRS>

In the communication system 100 according to the present embodiment, two kinds of SRSs, which are identified by a parameter $k_{TC}$ called "transmissionComb" are defined. Each communication terminal 2 transmits either one of these two kinds of SRSs in the SRS transmission symbol period 370.

As the parameter $k_{TC}$, a value of "0" or "1" can be taken. A plurality of subcarriers SC0 used for transmission of an SRS specified by parameter $k_{TC}=0$ (hereinafter referred to as "SRS0") is not arranged continuously but in a pectinate form in the frequency direction. In other words, a carrier frequency of SRS0 is arranged in the pectinate form in the frequency direction. Similarly, a plurality of subcarriers SC1 used for transmission of an SRS specified by parameter $k_{TC}=1$ (hereinafter referred to as "SRS1") is arranged in a pectinate form in the frequency direction. Then, when the SRS0 and the SRS1 are transmitted in the same frequency band, the plurality of subcarriers SC0 for use in transmission of the SRS0 and the plurality of subcarriers SC1 for use in transmission of the SRS1 are alternately arranged in the frequency direction. Hence a carrier frequency of the SRS0 and a carrier frequency of SRS1 do not overlap each other in the frequency direction.

Figure 7:
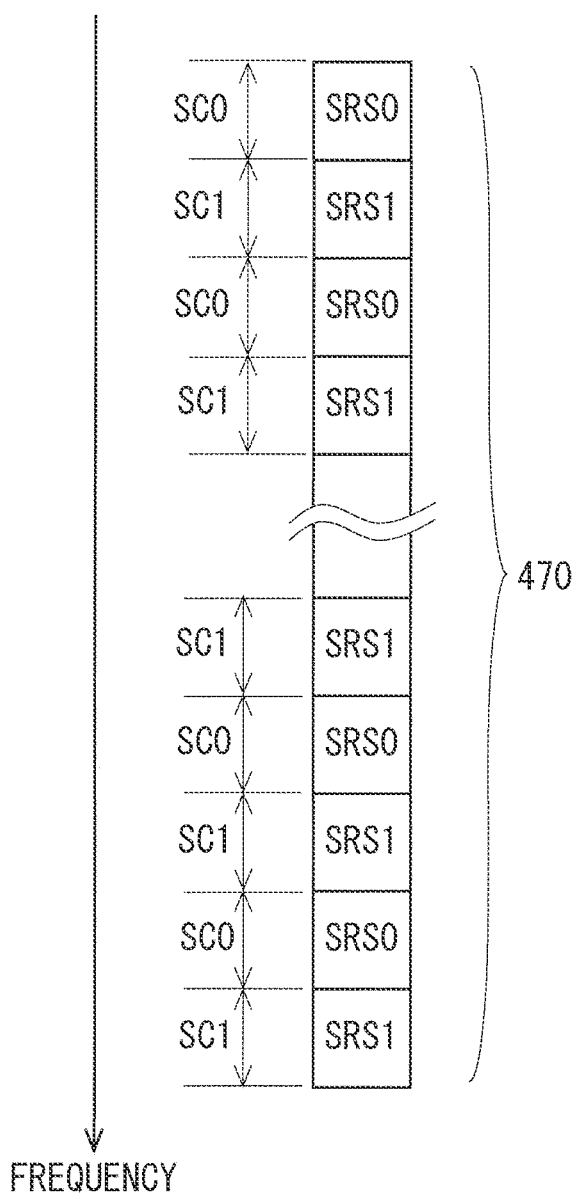
FIG. 7 is a diagram showing a configuration of the SRS.

FIG. 7 shows a state where both the SRS0 and the SRS1 are transmitted in some frequency band 470 included in the SRS transmittable band 400. As shown in FIG. 7, a plurality of subcarriers SC0 for use in transmission of the SRS0 is arranged in every other subcarrier in the frequency direction. Similarly, a plurality of subcarriers SC1 for use in transmission of the SRS1 is arranged in every other subcarrier in the frequency direction. Then, the plurality of subcarriers SC0 and the plurality of subcarriers SC1 which are included in the same frequency band 470 are alternately arranged in the frequency direction.

As thus described, since the plurality of subcarriers used by one communication terminal 2 transmitting an SRS are arranged in the pectinate form, all subcarriers in the SRS transmission band used by the communication terminal 2 are not used for transmission of the SRS. Since the plurality of subcarriers SC0 and the plurality of subcarriers SC1 included in the same frequency band are alternately arranged, the communication terminal 2 that transmits the SRS0 and the communication terminal 2 that transmits the SRS1 can use the same SRS transmission band in the same SRS transmission symbol period 370. When seen from the base station 1 side, the base station 1 can distinguish between the SRS0 and the SRS1 which are transmitted in the same SRS transmission band in the SRS transmission symbol period 370.

Further, in the present communication system 100, eight kinds of code patterns are defined. Each of the eight kinds of code patterns is made up of a plurality of complex symbols constituting an SRS. Eight kinds of code sequences being orthogonal to one another have been adopted to the eight kinds of code patterns. The communication terminal 2 transmits any one of the eight kinds of code patterns as the SRS.

As thus described, as for the SRS, the eight kinds of code patterns adopted with the eight kinds of code sequences being orthogonal to one another are defined, and hence the communication terminal 2 in number up to eight can transmit the SRS0 by use of the same SRS transmission band in the same SRS transmission symbol period 370, while the communication terminal 2 in number up to eight can transmit SRS1 by use of the same SRS transmission band in the same SRS transmission symbol period 370.

In the base station 1, the radio resource allocating unit 122 allocates, to each communication terminal 2 as the communication subject, a bandwidth of the SRS transmission band (hereinafter referred to as "SRS transmission bandwidth"), the SRS transmission symbol period 370, the kind of code pattern of the SRS, a frequency hopping method for the SRS transmission band, and a value of the parameter $k_{TC}$. The transmitted signal generating unit 120 generates a transmitted signal including a control signal (hereinafter referred to as "SRS control signal") for notifying the communication terminal 2 of the SRS transmission bandwidth and the like allocated to the communication terminal 2, in the radio resource allocating unit 122. This transmitted signal is transmitted from the communication unit 13 toward the communication terminal 2. Accordingly, the SRS control signal is transmitted to each communication terminal 2, and each communication terminal 2 can recognize the SRS transmission bandwidth allocated to itself, the SRS symbol period 305, the kind of code pattern of the SRS, the frequency hopping method for the SRS transmission band, and the value of the parameter $k_{TC}$. Each communication terminal 2 transmits the SRS in every SRS transmission period 360 based on the SRS transmission bandwidth allocated to itself, and the like.

It is to be noted that the above SRS control signal is called an "RRCConnectionReconfiguration message" in LTE. Further, in LTE, a variety of parameters have been set for notifying the communication terminal 2 of the SRS transmission bandwidth and the like. For example, the SRS transmission bandwidth is decided by a parameter $C_{SRS}$ called "srs-BandwidthConfig" and a parameter $B_{SRS}$ called "srs-Bandwidth", and by notifying the communication terminal 2 of values of the parameters $C_{SRS}$ and $B_{SRS}$, it is possible to notify the communication terminal 2 of the SRS transmission bandwidth.

<Basic Operation of Communication System at the Time of Controlling Transmission of SRS>

Figure 8:
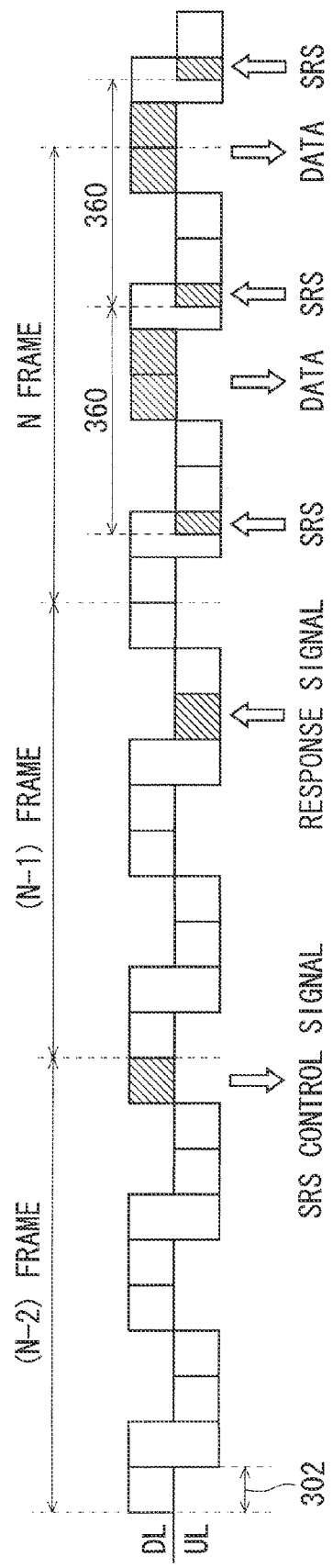
FIG. 8 is a diagram showing an operation of a communication system.

Subsequently, there will be described a basic operation of the communication system 100 from reception of a new SRS control signal by the communication terminal 2 to transmission of an SRS by the communication terminal 2 based on the new SRS control signal. FIG. 8 is a diagram showing the operation. Hereinafter, the communication terminal 2 as a subject of description may be referred to as a "subject communication terminal 2".

As shown in FIG. 8, when a new SRS control signal is transmitted from the base station 1 to the subject communication terminal 2 in the downlink subframe 302 located at the end of the (N−2)th TDD frame 300, the subject communication terminal 2 transmits to the base station 1a response signal for notifying that the new SRS control signal has normally been received in the uplink subframe 302 located eighth from the top of the subsequent (N−1)th TDD frame 300. This response signal is called "RRCConnectionReconfigurationComplete message". This leads to new setting of the SRS transmission bandwidth and the like in the subject communication terminal 2.

The subject communication terminal 2 having transmitted the response signal transmits an SRS based on a new SRS control signal received in the (N−2)th TDD frame 300 in every SRS transmission period 360 from the subsequent Nth TDD frame 300. It is to be noted that, until transmitting a SRS based on a new SRS control signal, the subject communication terminal 2 transmits an SRS based on an SRS control signal received therebefore.

As thus described, when the base station 1 transmits a new SRS control signal to the subject communication terminal 2 in some TDD frame 300, the subject communication terminal 2 transmits an SRS based on the new SRS control signal from the TDD frame 300 which is two frames after the above TDD frame 300.

In the base station 1, upon receipt of the SRS from the subject communication terminal 2 in one SRS transmission period 360, the transmission directivity at the array antenna 110 is controlled based on the received SRS at the time of transmitting data for the subject communication terminal 2 in that one SRS transmission period 360. That is, control of the transmission directivity at the time of transmitting data to the subject communication terminal 2 in the downlink subframe 302 of one SRS transmission period 360 is performed based on the SRS received from the subject communication terminal 2 in that one SRS transmission period 360.

In the base station 1, when an SRS from the subject communication terminal 2 is received in the communication unit 13, the reception weight processing unit 124 calculates a reception weight based on the SRS. The transmission weight processing unit 123 then calculates a transmission weight to be applied to the transmitted signal for the subject communication terminal 2, based on the reception weight calculated in the reception weight processing unit 124. The transmission weight processing unit 123 sets the calculated transmission weight to a plurality of transmitted signals including data for the subject communication terminal 2 and generated in the transmitted signal generating unit 120, and inputs the plurality of transmitted signals set with the transmission weight into the radio process unit 11. Accordingly, a beam in relation to the transmission directivity in a frequency band of a transmitted signal to the subject communication terminal 2 at the array antenna 110 is directed to the subject communication terminal 2 so that data can be appropriately transmitted to the subject communication terminal 2.

<Association of SRS Transmission Symbol Period with Downlink Radio Resource>

Figure 9:
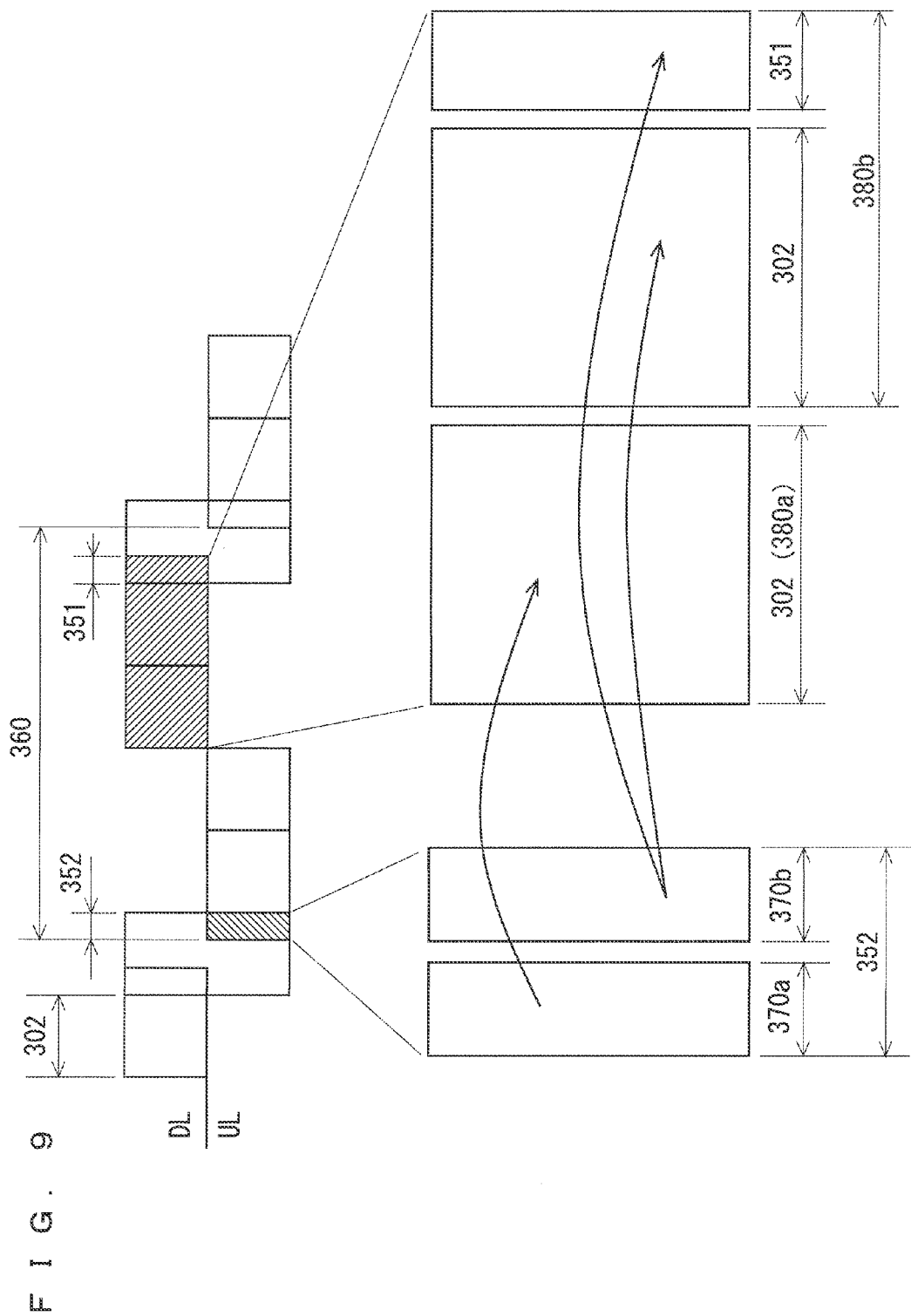
FIG. 9 is a diagram showing association of an SRS transmission symbol period with a downlink period.

In the communication system 100 according to the present embodiment, in each SRS transmission period 360, the first SRS transmission symbol period 370a is associated with a plurality of symbol periods 304 of the first downlink subframe 302 subsequent thereto, and the second SRS transmission symbol period 370b is associated with a plurality of symbol periods 304 of the second downlink subframe 302 subsequent thereto and the downlink pilot time slot 351 subsequent thereto. FIG. 9 is a diagram showing that state. Although the SRS transmission period 360 including the uplink pilot time slot 352 of the first special subframe 302 in the TDD frame 300 is shown in FIG. 9, the same applies to the SRS transmission period 360 including the uplink pilot time slot 352 of the second special subframe 302 in the TDD frame 300.

Hereinafter, a plurality of symbol periods 304 in the downlink subframe 302 which are associated with the first SRS transmission symbol period 370a are referred to as a "first downlink communication period 380a". Further, a plurality of symbol periods 304 of the downlink subframe 302 which are associated with the second SRS transmission symbol period 370b and the downlink pilot time slot 351 associated with the second SRS transmission symbol period 370b are in combination referred to as a "second downlink communication period 380b". When distinguishing between the first downlink communication period 380a and the second downlink communication period 380b is not necessarily required, each of them is referred to as a "downlink communication period 380".

In the communication unit 13 of the base station 1, at the time of transmitting a transmitted signal including a variety of data in the downlink communication period 380, a transmission weight to be applied to a transmitted signal is calculated based on an SRS transmitted from the subject communication terminal 2 in the SRS transmission symbol period 370 associated with that downlink communication period 380 (specifically, a reception weight is calculated based on the SRS and a transmission weight is calculated based on the reception weight). That is, in the base station 1, at the time of transmitting a transmitted signal to the subject communication terminal 2 by use of the downlink communication period 380, the transmission directivity at the array antenna 110 is controlled based on an SRS transmitted from the subject communication terminal 2 in the SRS transmission symbol period 370 associated with that downlink communication period 380, thereby to direct a beam of that transmission directivity to the subject communication terminal 2 in the frequency band of that transmitted signal.

Further, in the radio resource allocating unit 122 of the base station 1, a downlink radio resource is allocated to the subject communication terminal 2 based on proportional fairness (PF) or the like such that a frequency band of a transmitted signal to be transmitted to the subject communication terminal 2 in the downlink communication period 380 is included in a transmission frequency band of an SRS received in the SRS transmission symbol period 370 associated with that downlink communication period 380. Then in the communication unit 13 of the base station 1, a transmission weight is calculated using a portion of SRS received from the subject communication terminal 2 in the SRS transmission symbol period 370, the portion having the same frequency band as the frequency band of the transmitted signal that is transmitted to the subject communication terminal 2 in the downlink communication period 380 associated with that SRS transmission symbol period 370. That is, in the base station 1, a transmission weight is calculated using a plurality of complex symbols of a plurality of complex symbols constituting an SRS received from the subject communication terminal 2 in the SRS transmission symbol period 370, the plurality of complex symbols being transmitted using the same frequency band as the frequency band of the transmitted signal that is transmitted to the subject communication terminal 2 in the downlink communication period 380 associated with that SRS transmission symbol period 370. As thus described, it is possible to calculate an accurate transmission weight by making a frequency band of a transmitted signal coincident with a frequency band of an SRS that is used at the time of calculating a transmission weight to be applied to that transmitted signal.

Figure 10:
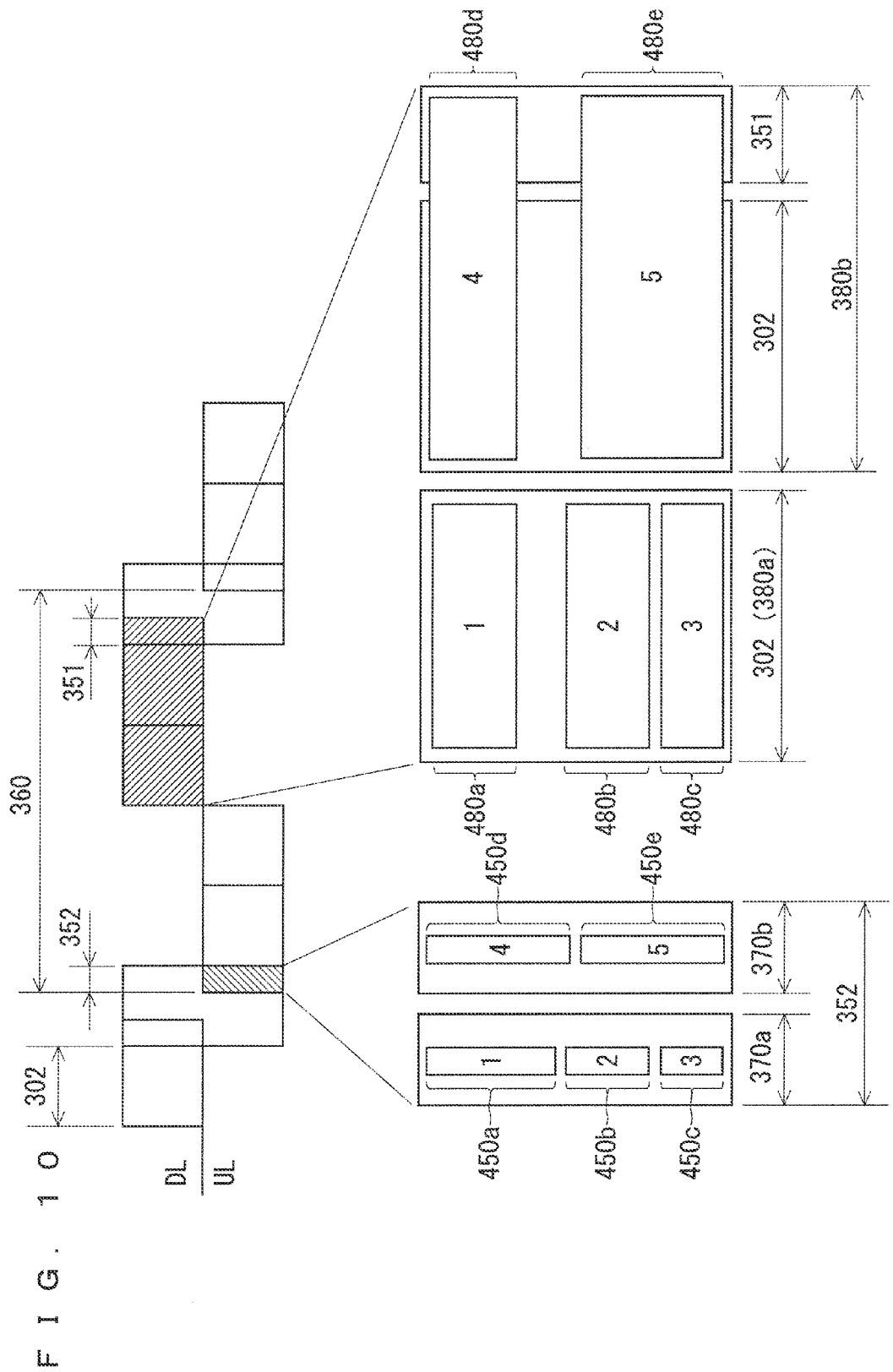
FIG. 10 is a diagram showing an example of allocating a downlink radio resource to a communication terminal.

FIG. 10 is a diagram showing an example of allocating the downlink radio resource to the communication terminal 2. In the example of FIG. 10, the communication terminals 2 of terminal No. 1 to 3 each transmit an SRS in coincides with the first SRS transmission symbol period 370a, and the communication terminals 2 of terminal No. 4 and 5 each transmit an SRS in the second SRS transmission symbol period 370b.

In the first downlink communication period 380a, a frequency band 480a of a transmitted signal to be transmitted to the communication terminal 2 of the terminal No. 1 is included in an SRS transmission band 450a concerning that communication terminal 2. Then, a width of the frequency band 480a is made smaller than a width of the SRS transmission band 450a.

In the first downlink communication period 380a, a frequency band 480b of a transmitted signal to be transmitted to the communication terminal 2 of the terminal No. 2 is included in an SRS transmission band 450b concerning that communication terminal 2. Then a width of the frequency band 480b coincides with a width of the SRS transmission band 450b.

In the first downlink communication period 380a, a frequency band 480c of a transmitted signal to be transmitted to the communication terminal 2 of the terminal No. 3 is included in an SRS transmission band 450c concerning that communication terminal 2. Then a width of the frequency band 480c coincides with a width of the SRS transmission band 450c.

In the second downlink communication period 380b, a frequency band 480d of a transmitted signal to be transmitted to the communication terminal 2 of the terminal No. 4 is included in an SRS transmission band 450*d* concerning that communication terminal 2. Then, a width of the frequency band 480*d* is made smaller than a width of the SRS transmission band 450*d*.

In the second downlink communication period 380*b*, a frequency band 480*e* of a transmitted signal to be transmitted to the communication terminal 2 of the terminal No. 5 is included in an SRS transmission band 450*e* concerning that communication terminal 2. Then a width of the frequency band 480*e* coincides with a width of the SRS transmission band 450*e*.

<Proper Use of SRS0 ($k_{TC}$=0) and SRS1 ($k_{TC}$=1)>

In the communication system 100, at the time of the base station 1 transmitting a signal to the long-distance terminal 2 for its own device, it is likely to interfere with the long-distance terminal 2 for the peripheral base station 1, with which the peripheral base station 1 communicates. This will hereinafter be described using FIG. 11.

Figure 11:
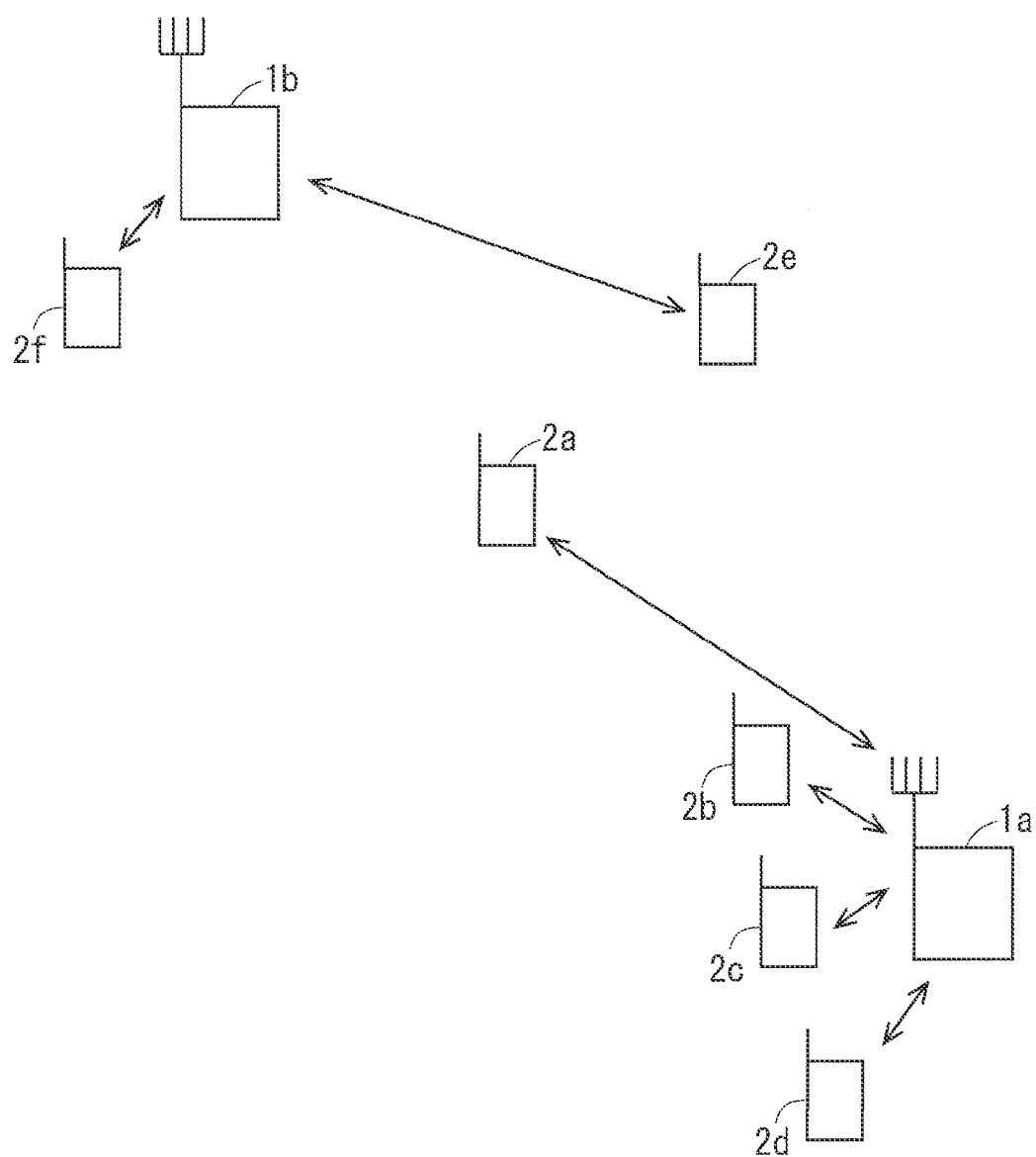
FIG. 11 is a view showing one example of states where a base station and a peripheral base station communicate with communication terminals.

FIG. 11 is a diagram showing a state where a base station 1*a* and a peripheral base station 1*b* located on the periphery thereof communicate with the communication terminals 2. A long-distance terminal 2*a* is a communication terminal 2 that communicates with the base station 1*a* and exists in a position distant from the base station 1*a*. Short-distance terminals 2*b* to 2*d* are communication terminals 2 that communicate with the base station 1*a* and exists in a position close to the base station 1*a*. A long-distance terminal 2*e* is a communication terminal 2 that communicates with the peripheral base station 1*b* and exists in a position distant from the peripheral base station 1*b*. A short-distance terminal 2*f* is a communication terminal 2 that communicates with the peripheral base station 1*b* and exists in a position close to the peripheral base station 1*b*.

Hereinafter, in the case of focusing attention on some base station, a long distance terminal and a short-distance terminal for the base station are respectively referred to as an "own-station long-distance terminal" and an "own-station short-distance terminal", and a long distance terminal and a short-distance terminal for a peripheral base station located on the periphery of the above base station are respectively referred to as an "another-station long-distance terminal" and an "another-station short-distance terminal".

There is a high possibility that the own-station long-distance terminal 2*a* that communicates with the base station 1*a* exist in a position close to the another-station long-distance terminal 2*e* that communicates with the peripheral base station 1*b*, as in FIG. 11. In this case, a transmitted signal that the base station 1*a* transmits to the own-station long-distance terminal 2*a* easily reaches the another-station long-distance terminal 2*e*. For this reason, when the peripheral base station 1*b* transmits a signal to the another-station long-distance terminal 2*e* in the timing for the base station 1*a* to transmit a signal to the own-station long-distance terminal 2*a*, the another-station long-distance terminal 2*e* receives an interference wave with large electric power from the base station 1*a* simultaneously with receiving the signal from the peripheral base station 1*b*. Hence reception quality may deteriorate in the another-station long-distance terminal 2*e*.

On the other hand, the own-station long-distance terminal 2*a* exists in a position distant from the another-station short-distance terminal 2*f*. Hence a transmitted signal that the base station 1*a* transmits to the own-station long-distance terminal 2*a* does not easily reach the another-station short-distance terminal 2*f*. For this reason, even when the peripheral base station 1*b* transmits a signal to the another-station short-distance terminal 2*f* in the timing for the base station 1*a* to transmit a signal to the own-station long-distance terminal 2*a*, the another-station short-distance terminal 2*f* receives an interference wave with small electric power from the base station 1*a* simultaneously with receiving the signal from the peripheral base station 1*b*. Accordingly, an effect exerted by the interference wave from the base station 1*a* on the reception quality of the another-station short-distance terminal 2*f* is small.

As thus described, since it is highly possible that the own-station long-distance terminal 2 with which the base station 1 communicates exists in a position close to the another-station long-distance terminal 2, it can be said that there is a high possibility that the base station 1 interferes with the another-station long-distance terminal 2 when transmitting a signal to the own-station long-distance terminal 2. Accordingly, at the time of the base station 1 transmitting a signal to the own-station long-distance terminal 2, a null of the transmission directivity at the array antenna 110 is desirably directed to the another-station long-distance terminal 2.

As opposed to this, since the own-station long-distance terminal 2, with which the base station 1 communicates, exists in a position distant from the another-station short-distance terminal 2, it can be said that the level of the base station 1 causing interference to the other-station short-distance terminal 2 is low when the base station 1 transmits a signal to the own-station long-distance terminal 2. Accordingly, at the time of the base station 1 transmitting a signal to the own-station long-distance terminal 2, a problem is unlikely to occur even when a null of the transmission directivity at the array antenna 110 is not directed to the another-station short-distance terminal 2.

Thereat in the communication system 100 according to the present embodiment, the long-distance terminal 2 is made to use one of SRS0 and SRS1 whose carrier frequencies do not overlap each other, while the short-distance terminal 2 is made to use the other of the SRS0 and SRS1, so that a null of the transmission directivity at the array antenna 110 is directed to the another-station long-distance terminal 2 while the null is not directed to the another-station short-distance terminal 2 when each base station 1 transmits a signal to the own-station long-distance terminal 2 by performing null-steering in relation to the transmission directivity at the array antenna 110. This can reliably prevent the null from being directed to the communication terminal 2, to which the null does not need to be directed. Since the number of settable nulls can depend on the number of antennas 110*a* constituting the array antenna 110 (when the number of antennas is M, the maximum number of settable nulls is (M−1)), the null is prevented from being directed to the communication terminal 2, to which the null does not need to be directed, thereby to reliably allow the null to be directed to the communication terminal 2 (another-station long-distance terminal 2), to which the null needs to be directed. This will hereinafter be described in detail. In the following description, the short-distance terminal 2 uses the SRS0 and the long-distance terminal 2 uses the SRS1.

In each base station 1 according to the present embodiment, when the terminal specification unit 125 specifies the own-station long-distance terminal 2 as described above, the transmitted signal generating unit 120 generates an SRS control signal including "1" as a value of the parameter $k_{TC}$. This SRS control signal is transmitted from the communication unit 13 to the own-station long-distance terminal 2. This leads the own-station long-distance terminal 2 to transmit the SRS1.

Meanwhile, when the terminal specification unit 125 specifies the own-station short-distance terminal 2, the transmitted signal generating unit 120 generates an SRS control signal including "0" as a value of the parameter $k_{TC}$. This SRS control signal is transmitted from the communication unit 13 to the own-station short-distance terminal 2. This leads the own-station short-distance terminal 2 to transmit the SRS0.

It should be noted that as described above, based on received electric power of a signal from the communication terminal 2, an amount of deviation of the reception timing for the signal, and the like, the terminal specification unit 125 specifies whether the communication terminal 2 is the long-distance terminal 2 to be transmitted with the SRS1 or the short-distance terminal 2 to be transmitted with the SRS0. Hence it can be said that the terminal specification unit 125 functions as a decision unit for deciding which one between the SRS0 or the SRS1 is to be transmitted by the communication terminal 2 based on a signal from the communication terminal 2.

In the base station 1, when the terminal specification unit 125 determines that the communication terminal 2 specified as the long-distance terminal 2 moves to be changed to the short-distance terminal 2, the communication unit 13 transmits to the communication terminal 2 a new SRS control signal including "0" as a value of the parameter $k_{TC}$. Further, in the base station 1, when the terminal specification unit 125 determines that the communication terminal 2 specified as the short-distance terminal 2 moves to be changed to the long-distance terminal 2, the communication unit 13 transmits to the communication terminal 2 a new SRS control signal including "1" as a value of the parameter $k_{TC}$.

A transmission frequency bandwidth of the SRS1 transmitted by the long-distance terminal 2 is desirably made smaller than a transmission frequency bandwidth of the SRS0 that is transmitted by the short-distance terminal 2. The long-distance terminal 2 needs to transmit the SRS farther than the short-distance terminal 2, and larger transmitted electric power is thus required in the long-distance terminal 2. On the other hand, when the frequency bandwidth of the transmitted signal of the communication terminal 2 is made smaller, transmitted electric power of the communication terminal 2 can be reduced. Accordingly, it is possible to suppress transmitted electric power in the long-distance terminal 2 by making small the transmission frequency bandwidth of the SRS1 transmitted by the long-distance terminal 2.

In each base station 1 according to the present embodiment, at the time of transmitting a signal to the own-station long-distance terminal 2 in the downlink communication period 380, null-steering and beam-forming in relation to the transmission directivity at the array antenna 110 are performed based on the SRS1 transmitted by that own-station long-distance terminal 2. In the present embodiment, a reception weight is updated a plurality of times based on a plurality of complex symbols included in the SRS1 by use of a sequentially updated algorithm such as an RLS (Recursive Least-Square) algorithm, to obtain a transmission weight based on the reception weight after completion of the update, whereby both null-steering and beam-forming are performed.

As opposed to this, at the time of transmitting a signal to the own-station short-distance terminal 2 in the downlink communication period 380, in each base station 1, beam-forming is performed and null-steering is not performed in relation to the transmission directivity at the array antenna 110 based on the SRS0 transmitted by that own-station short-distance terminal 2. Since transmitting a signal long distance is not necessary at the time of the base station 1 transmitting a signal to the own-station short-distance terminal 2, transmitted electric power is set small in the radio process unit 11 of the base station 1. For this reason, even when null-steering is not performed at the time of transmitting a signal to the short-distance terminal 2, the level of an interference wave from the base station 1 is small, the wave being received by the communication terminal 2 communicating with the peripheral base station 1, thereby allowing reception quality in that communication terminal 2 to be ensured.

It is to be noted that at the time of transmitting a signal to the own-station short-distance terminal 2, both beam-forming and null-steering may be performed. When both beam-forming and null-steering are performed, a gain of the beam tends to be small as compared with the case of only beam-forming being performed, and hence it is desirable to perform only beam-forming as in the present embodiment.

The transmission weight is, for example, obtained in every frequency band of one resource block. Hereinafter, a frequency band of one resource block is referred to as a "allocation unit band". For example, assuming that the frequency band of the transmitted signal to be transmitted in the downlink communication period 380 to the subject communication terminal 2 is configured of four allocation unit bands, a transmission weight is obtained concerning each of the four allocation unit bands. The transmission weight that is applied to a signal to be transmitted to the subject communication terminal 2 by use of some allocation unit band is obtained based on a plurality of complex symbols transmitted using that allocation unit band, out of a plurality of complex symbols constituting the SRS received from the subject communication terminal 2. With one resource block containing 12 subcarriers, 12 complex symbols can be transmitted using one allocation unit band.

Figure 12:
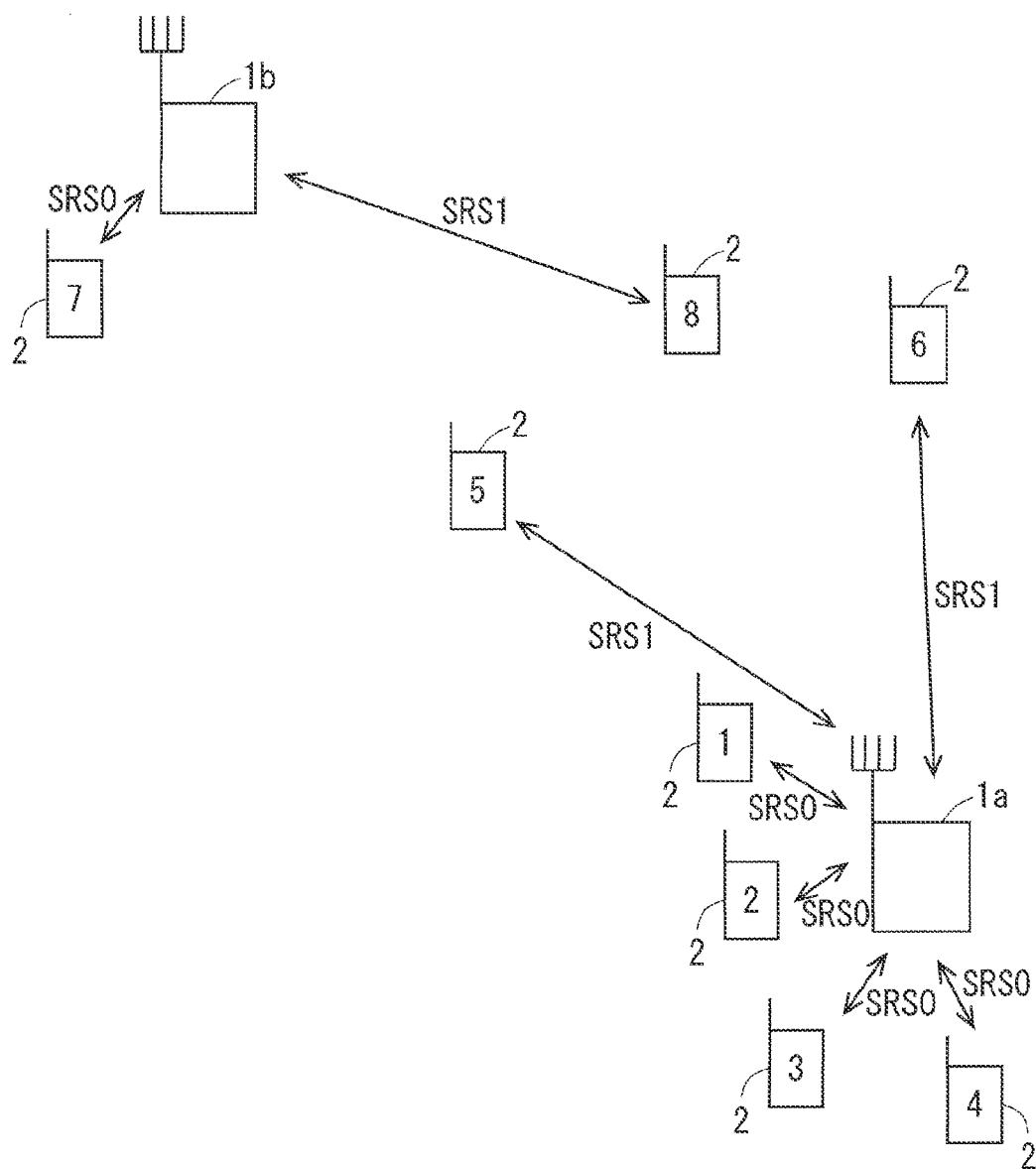
FIG. 12 is a view showing one example of the states where the base station and the peripheral base station communicate with communication terminals.
Figure 13:
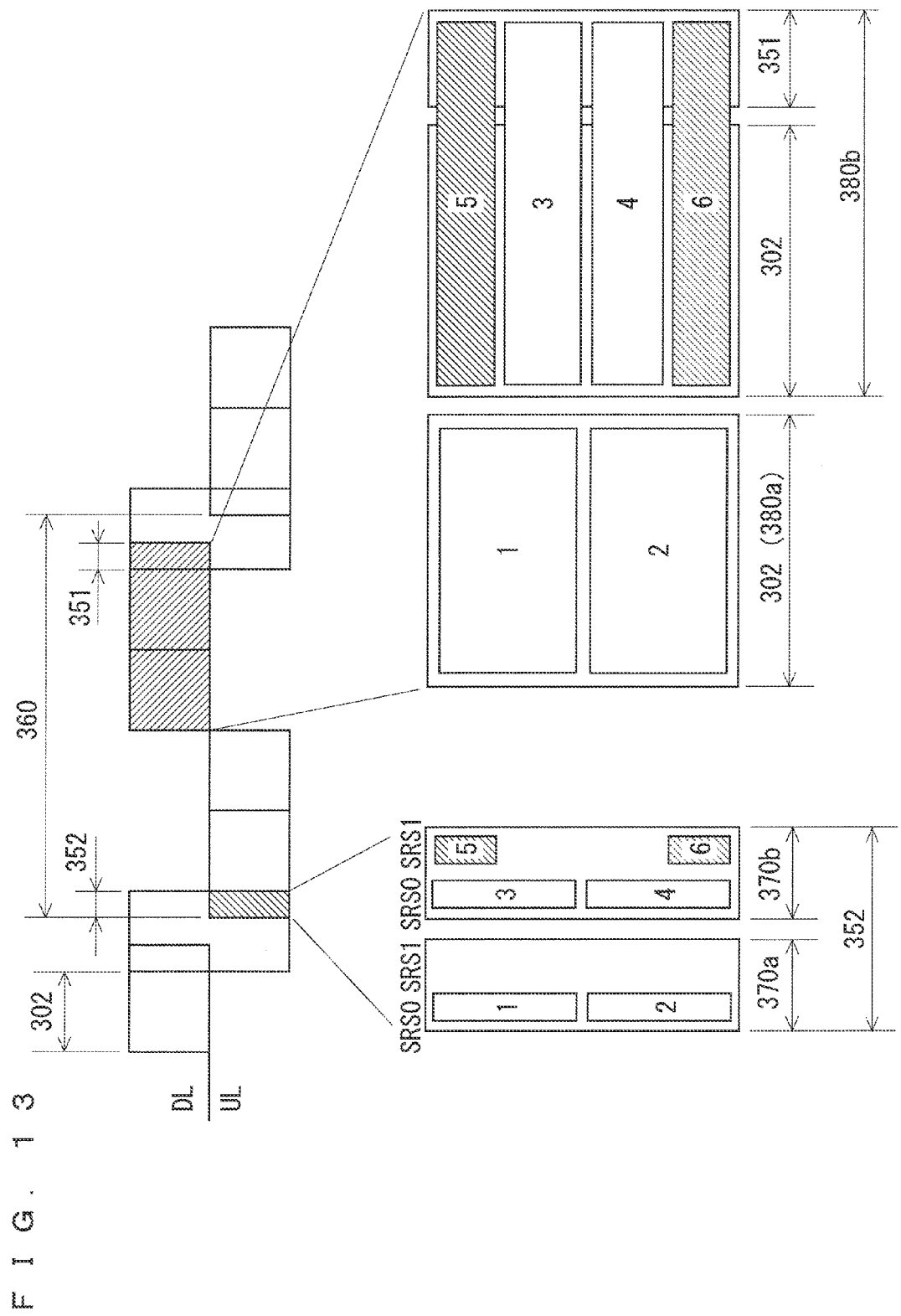
FIG. 13 is a diagram showing an example of allocating the downlink radio resource to the communication terminal.

FIG. 12 is a diagram showing a state where a base station 1a and a peripheral base station 1b located on the periphery thereof communicate with the communication terminals 2. FIG. 13 is a diagram showing an example of allocating the downlink radio resource to the communication terminal 2 at the base station 1a in the state shown in FIG. 12. In FIG. 12, numerals indicated in rectangles showing the communication terminals 2 are terminal numbers.

In the example of FIG. 13, the own-station short-distance terminals 2 of terminal No. 1 and 2 each transmit the SRS0 in the first SRS transmission symbol period 370a, and the own-station short-distance terminals 2 of terminal No. 3 and 4 each transmit the SRS0 in the second SRS transmission symbol period 370b. Further, the own-station long-distance terminals 2 of terminal No. 5 and 6 each transmit the SRS1 in the second SRS transmission symbol period 370b. A transmission frequency bandwidth of the SRS0 is set smaller than a transmission frequency band of the SRS1.

Further in the example of FIG. 13, as for each of the communication terminals 2 of the terminal No. 1, 2, 5 and 6, the frequency bandwidth of the transmitted signal to the communication terminal 2 coincides with the SRS transmission bandwidth of the communication terminal 2. Moreover, as for each of the communication terminals 2 of the terminal No. 3 and 4, the frequency bandwidth of the transmitted signal to the communication terminal 2 is smaller than the SRS transmission bandwidth of the communication terminal 2.

It is to be noted that in the example of FIG. 13, a plurality of SRSs that are transmitted in the same SRS transmission symbol period 370 are set such the transmission frequency bands of those are different from one another. However, as code patterns of the plurality of SRSs, a plurality of code sequences orthogonal to each other may be respectively adopted, and the plurality of SRSs may be multiplexed in the same frequency band. However, since the orthogonality between these plurality of code sequences may collapse during transmission of a plurality of SRSs, as in FIG. 13, the transmission frequency bands of a plurality of SRSs to be transmitted in the same SRS transmission symbol period 370 may preferably be made different as much as possible, so as not to multiplex the plurality of SRSs.

Figure 14:
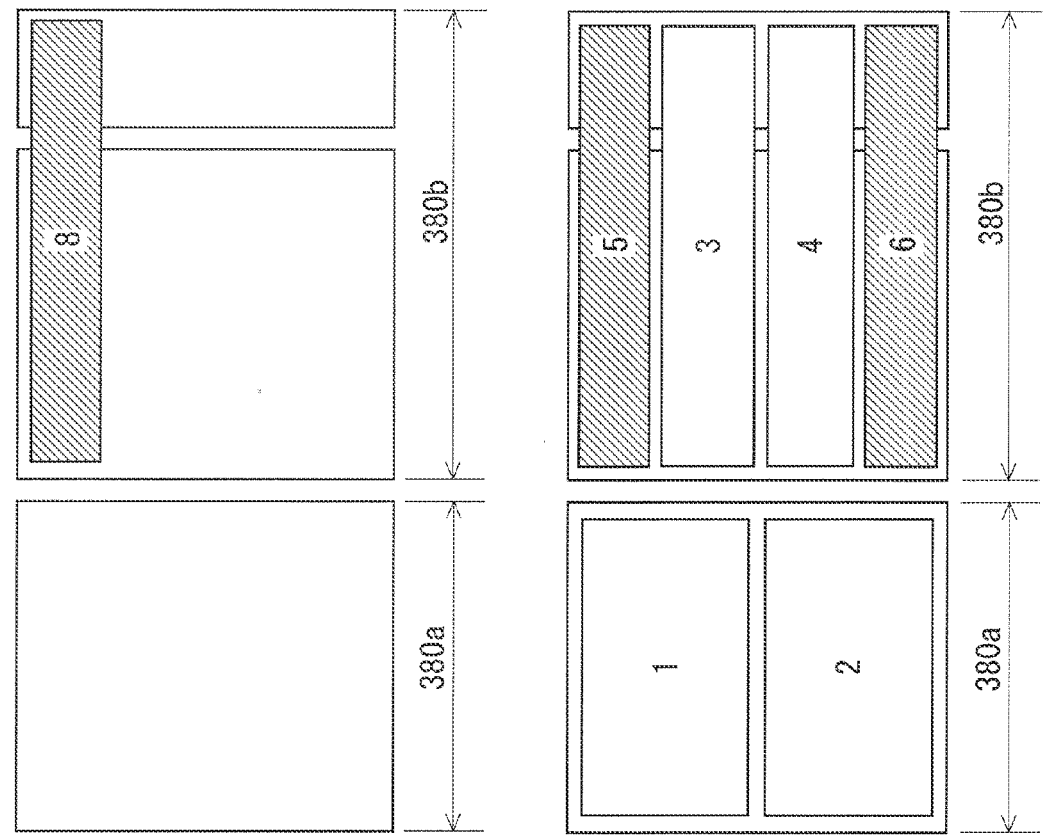
FIG. 14 is a diagram showing an example of allocating the downlink radio resource to the communication terminal.

There will be considered a case where the base station 1a receives the SRS1 transmitted by the another-station long-distance terminal 2 of the terminal No. 8 communicating with the peripheral base station 1 in the second SRS transmission symbol period 370b when the base station 1a and the peripheral base station 1b communicate with the communication terminal 2 in the states shown in FIGS. 12 and 13. In this case, as shown in FIG. 14, when a transmission frequency band of the SRS1 (hereinafter referred to as "SRS1-8") transmitted by the another-station long-distance terminal 2 of the terminal No. 8 (hereinafter referred to as another-station long-distance terminal 2-8") coincides with a transmission frequency band of the SRS1 (hereinafter referred to as "SRS1-5") transmitted by the own-station long-distance terminal 2 of the terminal No. 5 (hereinafter referred to as own-station long-distance terminal 2-5"), a carrier frequency of SRS1-8 completely coincides with a carrier frequency of SRS1-5. Accordingly, the SRS1-5 from the own-station long-distance terminal 2-5, which is received by the base station 1a, suffers interference from the SRS1-8 from the another-station long-distance terminal 2-8. Based on the SRS1-5 suffering interference from the SRS1-8 as thus described, when the base station 1a performs null-steering at the time of transmitting a signal to the own-station long-distance terminal 2-5 in the second downlink communication period 380b, a null is directed to the another-station long-distance terminal 2-8. Hence in the second downlink communication period 380b, it is possible to suppress that the another-station long-distance terminal 2-8 receives interference of a signal from the base station 1a at the time of receiving a signal from the peripheral base station 1b.

When the above state is seen from the peripheral base station 1b side, the SRS1-8 from the another-station long-distance terminal 2-8, which is received by the base station 1b, suffers interference from the SRS1-5 from the own-station long-distance terminal 2-5. Based on the SRS1-8 suffering interference from the SRS1-5 as thus described, when the peripheral base station 1b performs null-steering at the time of transmitting a signal to the another-station long-distance terminal 2-8 in the second downlink communication period 380b, a null is directed to the own-station long-distance terminal 2-5. Hence in the downlink communication period 380, it is possible to suppress that the own-station long-distance terminal 2-5 receives interference of a signal from the peripheral base station 1b at the time of receiving a signal from the base station 1a.

As thus described, in the base station 1a and the peripheral base station 1b, at the time of one base station 1 transmitting a signal to the long-distance terminal 2, a null is set to the long-distance terminal 2 in the transmission frequency band, with which the other base station 1 communicates. As thus described, in each of the base station 1a and the peripheral base station 1b, at the time of transmitting a signal to the long-distance terminal 2, with which itself communicates, it is possible to suppress causing interference to the long-distance terminal 2, with which the other base station 1 communicates.

Figure 15:
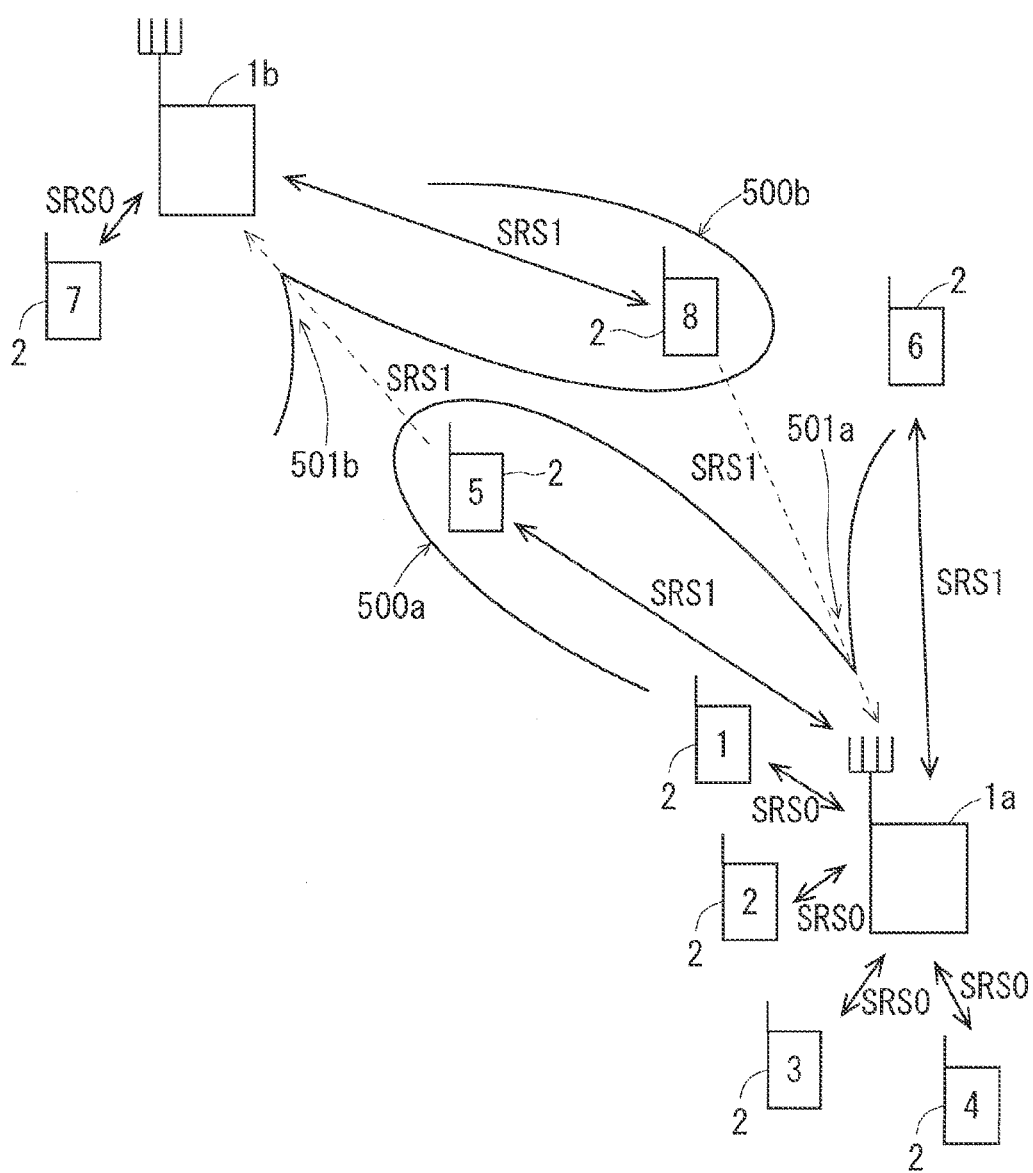
FIG. 15 is a view showing one example of the states where the base station and the peripheral base station communicate with communication terminals.

FIG. 15 is a view showing a beam and a null in the transmission directivity at each of the array antennas 110 of the base station 1a and the peripheral base station 1b in the above case. As shown in FIG. 15, at the time of the base station 1a directing a beam 500a to the own-station long-distance terminal 2-5 and transmitting a signal to the own-station long-distance terminal 2-5, a null 501a is directed to the another-station long-distance terminal 2-8. Further, at the time of the peripheral base station 1b directing a beam 500b to the another-station long-distance terminal 2-8 and transmitting a signal to the another-station long-distance terminal 2-8, a null 501b is directed to the own-station long-distance terminal 2-5.

Herein, differently from the present embodiment, when assuming that in each base station 1, a signal can be transmitted in either the first downlink communication period 380a or the second downlink communication period 380b, to the communication terminal 2 which transmits the SRS in the first SRS transmission symbol period 370a or the second SRS transmission symbol period 370b, the base station 1 may not be able to direct a null to the another-station long-distance terminal 2 in the timing for the peripheral base station 1 to transmit a signal to the another-station long-distance terminal 2.

Figure 16:
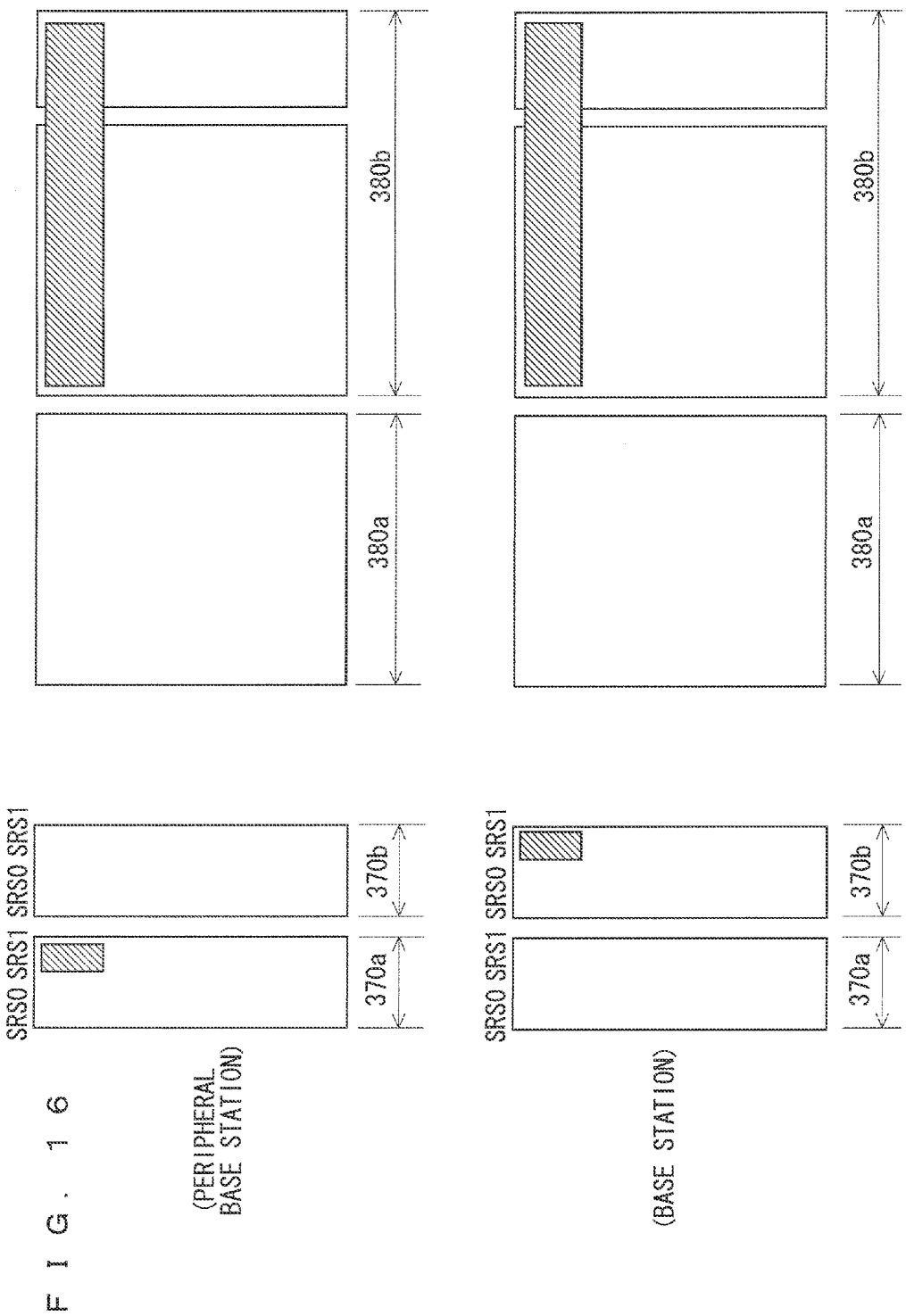
FIG. 16 is a diagram showing an example of allocating the downlink radio resource to the communication terminal.

For example, as shown in FIG. 16, a case is considered where the another-station long-distance terminal 2, to which the peripheral base station 1 transmits a signal in the second downlink communication period 380b, transmits the SRS1 in the first SRS transmission symbol period 370a and the own-station long-distance terminal 2, to which the base station 1 transmits a signal in the second downlink communication period 380b, transmits the SRS1 in the same frequency band as the SRS1 transmitted by the another-station long-distance terminal 2 in the second SRS transmission symbol period 370b.

In this case, the base station 1 does not receive the SRS1 from the another-station long-distance terminal 2 in the second SRS transmission symbol period 370b in which the base station 1 receives the SRS1 from the own-station long-distance terminal 2, and hence the base station 1 receives the SRS1 from the own-station long-distance terminal 2 which is not receiving interference from the SRS1 from the another-station long-distance terminal 2. Therefore, even when the base station 1 performs null-steering in the second downlink communication period 380b based on the SRS1 from the own-station long-distance terminal 2, a null is not directed to the another-station long-distance terminal 2. That is, the base station 1 cannot direct a null to the another-station long-distance terminal 2 in the timing for peripheral base station 1 to transmit a signal to the another-station long-distance terminal 2.

Further, for example, as shown in FIG. 17, a case is considered where the another-station long-distance terminal 2, to which a signal is transmitted by the peripheral base station 1 in the second downlink communication period 380b, transmits the SRS1 in the second SRS transmission symbol period 370b and the own-station long-distance terminal 2, to which a signal is transmitted by the base station 1 in the first downlink period 380b, transmits the SRS1 in the same frequency band as the SRS1 transmitted by the another-station long-distance terminal 2 in the second SRS transmission symbol period 370b.

In this case, the base station 1 receives the SRS1 from the own-station long-distance terminal 2, which has suffered interference from the SRS1 from the another-station long-distance terminal 2. Since the base station 1 performs null-steering based on the SRS1 from the own-station long-distance terminal 2 in the first downlink communication period 380a in which the another-station long-distance terminal 2 does not receive a signal from the peripheral base station 1, a null is directed to the another-station long-distance terminal 2 in the first downlink communication period 380a, but a null is not directed to the another-station long-distance terminal 2 in the second downlink communication period 380b in which the another-station long-distance terminal 2 receives a signal from the peripheral base station 1.

As opposed to this, in each base station 1 according to the present embodiment, a signal is transmitted to the communication terminal 2, which transmits the SRS in the first SRS transmission symbol period 370a, in the first downlink communication period 380a and a signal is transmitted to the communication terminal 2, which transmits the SRS in the second SRS transmission symbol period 370b, in the second downlink communication period 380a. In other words, in each base station 1, the downlink radio resource including the first downlink communication period 380a in the time direction is allocated to the communication terminal 2 which transmits the SRS in the first SRS transmission symbol period 370a, and the downlink radio resource including the second downlink communication period 380a in the time direction is allocated to the communication terminal 2 which transmits the SRS in the second SRS transmission symbol period 370b.

Accordingly, in the examples of FIGS. 13 to 15, in the case of the peripheral base station 1b transmitting a signal to the another-station long-distance terminal 2-8 in the second downlink communication period 380b in which the base station 1a transmits a signal to the own-station long-distance terminal 2-5, the base station 1a certainly receives the SR1-8 in the first SRS transmission symbol period 370a in which it receives the SRS1-5. That is, in the case of the peripheral base station 1b transmitting a signal to the another-station long-distance terminal 2-8 in the second downlink communication period 380b in which the base station 1a transmits a signal to the own-station long-distance terminal 2-5, the base station 1a certainly receives the SRS1-5 having suffered interference from SRS1-8. Accordingly, by the base station 1a performing null-steering based on the received SRS1-5 at the time of transmitting a signal to the own-station long-distance terminal 2-5, it is possible to certainly direct a null to the another-station long-distance terminal 2-8 in the timing for the another-station long-distance terminal 2-8 to receive a signal from the peripheral base station 1. Consequently, the another-station long-distance terminal 2-8 can suppress reception of a signal, which the base station 1a transmits toward the own-station long-distance terminal 2-5, at the time of receiving a signal from the peripheral base station 1. That is, the another-station long-distance terminal 2-8 can receive a signal from the peripheral base station 1 without receiving interference from a signal which the base station 1a transmits toward the own-station long-distance terminal 2-5.

Subsequently, as shown in FIG. 18, there will be considered a case where the SRS0 (hereinafter referred to as "SRS0-7") transmitted by the another-station short-distance terminal 2 of the terminal No. 7 (hereinafter referred to as another-station short-distance terminal 2-7") in the second SRS transmission symbol period 370b in which the base station 1a receives the SRS1 from the own-station long-distance terminal 2 of each of the terminal numbers 5 and 6, as well as a case where a transmission frequency band of the SRS0-7 coincides with a transmission frequency band of the SRS1-5 transmitted by the own-station long-distance terminal 2-5.

In this case, since carrier frequencies do not overlap between the SRS0 and the SRS1, even when the transmission frequency band of the SRS0-7 coincides with the transmission frequency band of SRS1-5, the carrier frequency of SRS0-7 is completely different from the carrier frequency of the SRS1-5. Hence the SRS1-5 received by the base station 1a hardly suffers interference from the SRS0-7. Even when the base station 1a performs null-steering, at the time of transmitting a signal to the own-station long-distance terminal 2-5 in the second downlink communication period 380b, based on the SRS1-5 hardly suffering interference from the SRS0-7, a null is not directed to the another-station short-distance terminal 2-7.

As thus described, a null is not directed to the another-station short-distance terminal 2 at the time of the base station 1a transmitting a signal to the own-station long-distance terminal 2. Similarly, a null is not directed to the own-station short-distance terminal 2 at the time of the peripheral base station 1b transmitting a signal to the another-station long-distance terminal 2.

It should be noted that, since the another-station short-distance terminal 2-7 exists in a position distant from the own-station long-distance terminal 2-5, even when a null is not directed to the another-station short-distance terminal 2-7 at the time of transmitting a signal to the own-station long-distance terminal 2-5, the another-station short-distance terminal 2-7 hardly receives interference of a signal to the own-station long-distance terminal 2-5.

<Setting of Transmission Frequency Bandwidth of SRS>

As described above, in order to suppress transmitted electric power of the long-distance terminal 2, a transmission frequency bandwidth of the SRS1 transmitted by the long-distance terminal 2 is desirably made smaller than a transmission frequency bandwidth of the SRS0 that is transmitted by the short-distance terminal 2.

Further, the long-distance terminal 2 is divided into an ultra-long-distance terminal 2 that exists in a position very distant from the base station 1 and an ordinary long-distance terminal 2 that exists in a position distant from the base station 1 to some extent, and, in order to suppress transmitted electric power of the ultra-long-distance terminal 2, a transmission frequency bandwidth of the SRS1 that is transmitted by the ultra-long-distance terminal 2 is desirably made smaller than a transmission frequency bandwidth of the SRS1 that is transmitted by the ordinary long-distance terminal 2. Moreover, the short-distance terminal 2 is divided into an ultra-short-distance terminal 2 that exists in a position very close to the base station 1 and an ordinary short-distance terminal 2 that exists in a position close to the base station 1 to some extent, and, in order to suppress transmitted electric power of the ordinary short-distance terminal 2, a transmission frequency bandwidth of the SRS0 that is transmitted by the ordinary-short-distance terminal 2 is desirably made smaller than a transmission frequency bandwidth of the SRS0 that is transmitted by the ultra-short-distance terminal 2. Hereinafter, a setting example for the SRS transmission bandwidth in this case will be described.

As described above, the SRS transmission bandwidth is decided by a parameter $C_{SRS}$ called "srs-BandwidthConfig" and a parameter $B_{SRS}$ called "srs-Bandwidth". Any one integer from "0" to "7" can be taken as the parameter $C_{SRS}$, and any one integer from "0" to "3" can be taken as the parameter $B_{SRS}$.

In a case where the system bandwidth is 20 MHz and the parameter $C_{SRS}$ is zero as in the present embodiment, four kinds of bandwidths can be set as the SRS transmission bandwidth, which are a zeroth bandwidth specified by the parameter $B_{SRS}=0$, a first bandwidth specified by the parameter $B_{SRS}=1$, a second bandwidth specified by the parameter $B_{SRS}=2$, and a third bandwidth specified by the parameter $B_{SRS}=3$. The zeroth bandwidth is 96 times as large as the allocation unit band, the first bandwidth is 48 times as large as the allocation unit band, the second bandwidth is 24 times as large as the allocation unit band, and the third bandwidth is four times as large as the allocation unit band.

In the present embodiment, the transmission frequency bandwidth of the SRS0 that is transmitted by the ultra-short-distance terminal 2 is set to the zeroth bandwidth, and the transmission frequency bandwidth of the SRS0 that is transmitted by the ordinary short-distance terminal 2 is set to the first bandwidth. Then, the transmission frequency bandwidth of the SRS1 that is transmitted by the ordinary long-distance terminal 2 is set to the second bandwidth, and the transmission frequency bandwidth of the SRS1 that is transmitted by the ultra-long-distance terminal 2 is set to the third bandwidth. This can make the SRS transmission bandwidths small in the order of the ultra-long-distance terminal 2, the ordinary short-distance terminal 2, the ordinary long-distance terminal 2 and the ultra-long-distance terminal 2.

As for the distinction between the ultra-long-distance terminal 2 and the ordinary-long-distance terminal 2, the communication terminal 2 is the ultra-long-distance terminal 2 when the distance L concerning that communication terminal 2 is not smaller than (L0×X) (where X>1), and the communication terminal 2 is the ordinary-long-distance terminal 2 when distance L concerning that communication terminal 2 is smaller than (L0×X) and larger than L0.

As for the distinction between the ultra-short-distance terminal 2 and the ordinary-short-distance terminal 2, the communication terminal 2 is the ultra-short-distance terminal 2 when the distance L concerning that communication terminal 2 is not larger than (L0/Y) (where Y>1), and the communication terminal 2 is the ordinary-long-distance terminal 2 when the distance L concerning that communication terminal 2 is larger than (L0/Y) and not larger than L0.

It is to be noted that in a case where the system bandwidth is 10 MHz and the parameter $C_{SRS}=0$, four kinds of bandwidths can be set, which are a zeroth bandwidth 48 times as large as the allocation unit band and specified by the parameter $B_{SRS}=0$, a first bandwidth 24 times as large as the allocation unit band and specified by the parameter $B_{SRS}=1$, a second bandwidth 12 times as large as the allocation unit band and specified by the parameter $B_{SRS}=2$, and a third bandwidth four times as large as the allocation unit band and specified by the parameter $B_{SRS}=3$.

As a method for deciding the threshold L0 which is used at the time of determining whether the communication terminal 2 is the long-distance terminal 2 or the short-distance terminal 2 in the base station 1, there may be concerned various methods.

For example, the threshold L0 may be decided based on the distance between the base stations 1 decided at the time of cell designing, and the decided threshold value L0 may previously stored into each base station 1.

Further, each base station 1 may decide the threshold value L0 by itself based on a signal from the peripheral base station 1. For example, the base station 1 receives broadcast channel information transmitted from a plurality of base stations 1 on its start-up, and specifies the closest peripheral base station 1 from the received electric power of the broadcast channel information. The base station 1 then estimates a distance between the peripheral base station 1 and the own-device based on the received electric power of the broadcast channel information from the closest peripheral base station 1 having been specified, to decide the threshold value L0 based on the estimated distance. Further, when each base station 1 is mounted with a GPS receiver that outputs positional information, the base station 1 specifies the closet peripheral base station 1 from the positional information transmitted from the plurality of peripheral base stations 1. The base station 1 then estimates a distance between the peripheral base station 1 and the own-device based on positional information from the closest peripheral base station 1 having been specified and positional information obtained by the GPS receiver of its own device, to decide the threshold value L0 based on the estimated distance. It is to be noted that the base station 1 may acquire positional information of each peripheral base station 1 from the server via a network.

As thus described, in the present embodiment, when the SRS1 in the same transmission frequency band as the transmission frequency band of the SRS1 from the communication terminal 2 with which the base station 1 communicates is transmitted from the communication terminal 2 with which the peripheral base station 1 communicates, the SRS1 from the communication terminal 2 with which the base station 1 communicates suffers interference from the SRS1 transmitted from the communication terminal 2 communicating with the peripheral base station 1. Accordingly, by the base station 1 performing null-steering based on the SRS1 from the communication terminal 2 communicating therewith, a null with the transmission directivity at the base station 1 is directed to the communication terminal 2 that transmits with the peripheral base station 1 and transmits the SRS1.

On the other hand, as for the SRS1 and the SRS0 in the same transmission frequency band, since a plurality of carriers used for transmission of the SRS1 and a plurality of carriers used for transmission of the SRS0 are alternately arranged in the frequency direction, even when the SRS0 in the same transmission frequency band as the transmission frequency band of the SRS1 from the communication terminal 2, with which the base station 1 communicates, is transmitted from the communication terminal 2 communicating with the peripheral base station 1, the SRS1 and the SRS0 do not overlap in a frequency region, and the SRS1 hardly suffers interference from the SRS0. Therefore, even when the base station 1 performs null-steering based on the SRS1 from the communication terminal 2 communicating therewith, a null is not directed to the communication terminal 2 that communicates with the peripheral base station 1 and transmits the SRS0.

Accordingly, as in the present embodiment, making the communication terminal 2 to which a null needs to be directed to transmit the SRS1 and making the communication terminal 2 to which a null does not need to be directed to transmit SRS0, a null is not directed to the communication terminal 2 communicating with the peripheral base station 1 to which a null does not need to be directed in the null-steering at the time of transmitting a signal to the communication terminal 2 that transmits the SRS1, which is executed by the base station 1. Since the number of nulls settable in the null-steering depends on the number of a plurality of antennas 110a constituting the array antenna 110, by making a null not directed to the communication terminal 2 to which a null does not need to be directed, a null can reliably be directed to the communication terminal 2 to which a null needs to be directed.

Further, as described above, in the terminal specification unit 125 of each base station 1, it is decided which one between the SRS0 or the SRS1 is to be transmitted based on the received electric power of the signal from the communication terminal 2, an amount of deviation in reception timing of a signal from the communication terminal 2, positional information concerning the communication terminal 2 or reception quality information in the communication terminal 2, whereby it is possible to transmit the SRS1 to the long-distance terminal 2 with which the base station 1 communicates, and transmit the SRS0 to the short-distance terminal 2 with which the base station 1 communicates. Hence at the time of the base station 1 transmitting a signal to the own-station long-distance terminal 2, a null is directed to the another-station long-distance terminal 2 while a null is not directed to the another-station short-distance terminal 2. Therefore, a null is not directed to the communication terminal 2 to which a null does not need to be directed, resulting in that a null can reliably be directed to the communication terminal 2 to which a null needs to be directed.

First Modified Example

In the above embodiment, a signal is transmitted to the short-distance terminal 2, which transmits the SRS0 in the first SRS transmission symbol period 370a, by use of only the first downlink communication period 380a, but that signal may be transmitted by use of both the first downlink communication period 380a and the second downlink communication period 380b or may be transmitted by use of only the second downlink communication period 380b.

Further, in the above embodiment, a signal is transmitted to the short-distance terminal 2, which transmits the SRS0 in the second SRS transmission symbol period 370b, by use of only the second downlink communication period 380a, but that signal may be transmitted by use of both the first downlink communication period 380a and the second downlink communication period 380b or may be transmitted by use of only the first downlink communication period 380a.

That is, a signal may be made transmittable to the short-distance terminal 2 which transmits SRS0 in either the first downlink communication period 380a or the second downlink communication period 380b regardless of the timing in which the SRS0 is transmitted.

Figure 19:
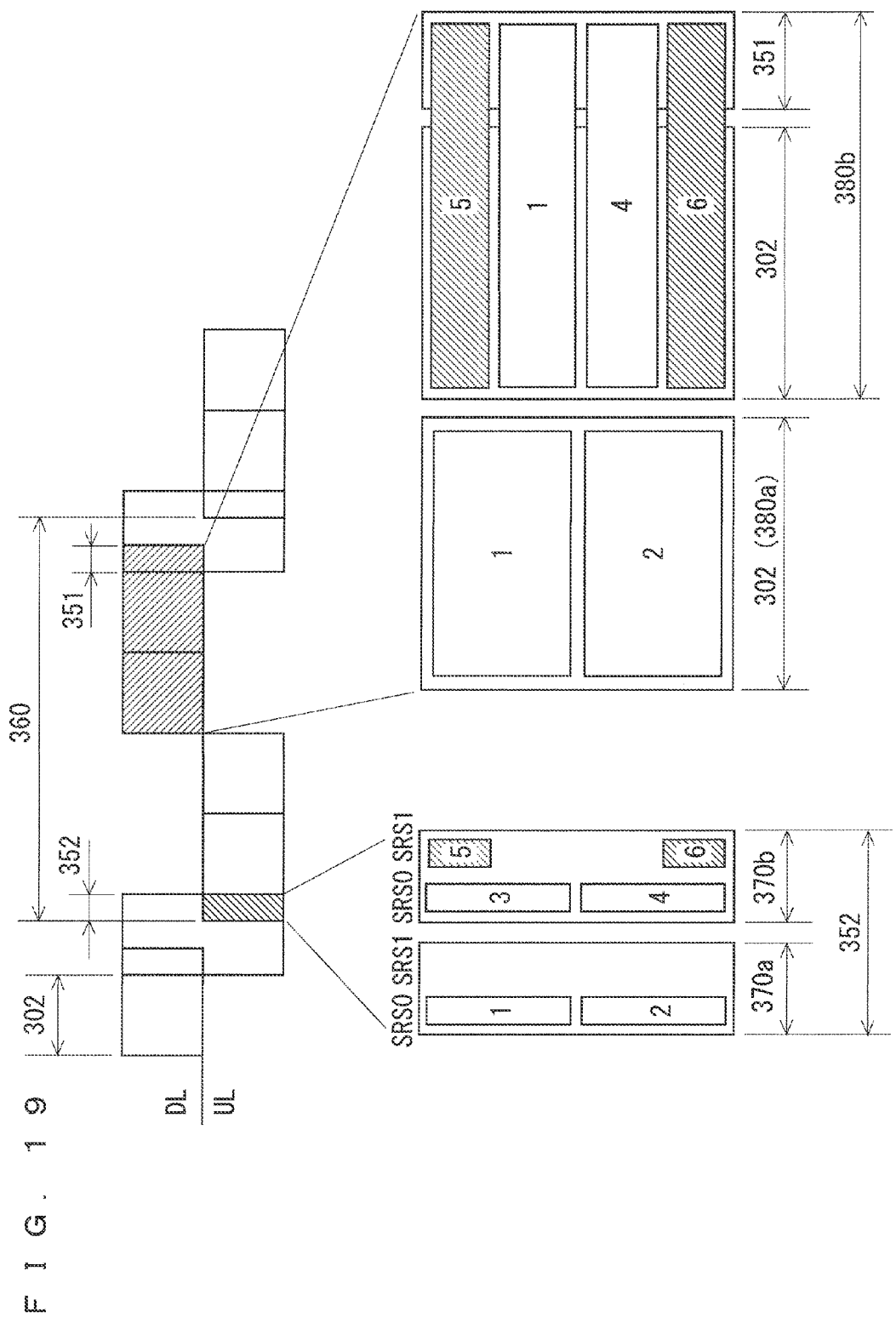
FIG. 19 is a diagram showing an example of allocating the downlink radio resource to the communication terminal.
Figure 20:
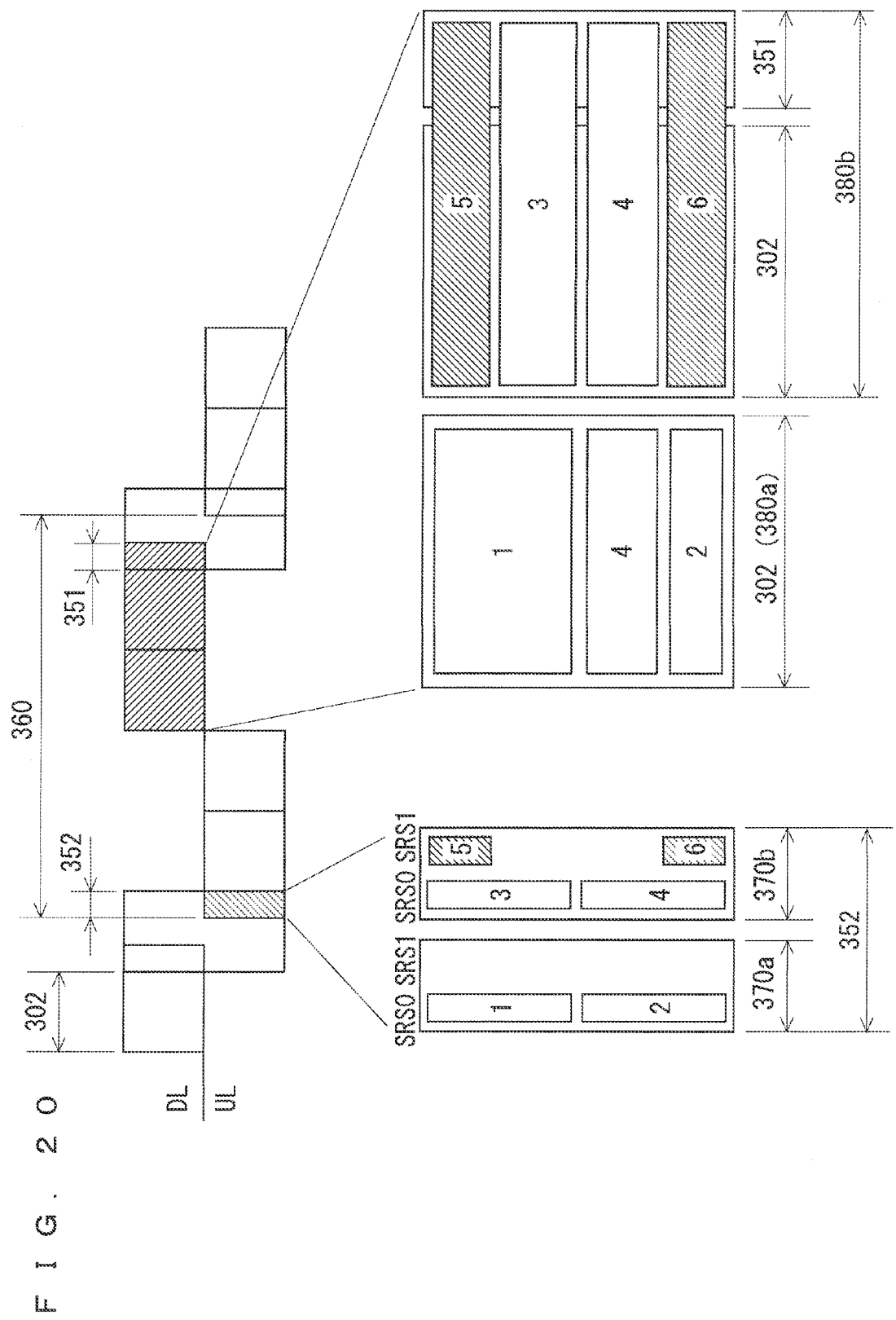
FIG. 20 is a diagram showing an example of allocating the downlink radio resource to the communication terminal.

FIGS. 19 and 20 are diagrams showing an example of allocating the downlink radio resource to the communication terminal 2 in the present modified example. FIG. 19 shows a case where, in the foregoing example of FIG. 13, a signal is transmitted to the short-distance terminal 2 of the terminal No. 1, which transmits the SRS0 in the first SRS transmission symbol period 370a, by use of both the first downlink communication period 380a and the second downlink communication period 380b. When an amount of transmitted data for the short-distance terminal 2 of the terminal No. 1 is large, both the first downlink communication period 380a and the second downlink communication period 380b are allocated to the short-distance terminal 2 as in the example of FIG. 19. It is to be noted that in the example of FIG. 19, the SRS0 from the short-distance terminal 2 of the terminal No. 3 is received, but in the SRS transmission period 360 in which that SRS0 is received, a signal is not transmitted to the short-distance terminal 2.

FIG. 20 shows a case where, in the foregoing example of FIG. 13, a signal is transmitted to the short-distance terminal 2 of the terminal No. 4, which transmits the SRS0 in the second SRS transmission symbol period 370b, by use of both the first downlink communication period 380a and the second downlink communication period 380b.

In the example of FIG. 19, the base station 1 performs beam-forming based on the SRS0 received in the first SRS transmission symbol period 370a at the time of transmitting a signal to the short-distance terminal 2 of the terminal No. 1 in the first downlink communication period 380a. Further, the base station 1 performs beam-forming based on the SRS0 received in the first SRS transmission symbol period 370a at the time of transmitting a signal to the short-distance terminal 2 of the terminal No. 1 in the second downlink communication period 380b.

As in the example of FIG. 20, the base station 1 performs beam-forming based on the SRS0 received in the second SRS transmission symbol period 370b at the time of transmitting a signal to the short-distance terminal 2 of the terminal No. 4 in the first downlink communication period 380a. Further, the base station 1 performs beam-forming based on the SRS0 received in the second SRS transmission symbol period 370b at the time of transmitting a signal to the short-distance terminal 2 of the terminal No. 4 in the second downlink communication period 380b.

As thus described, as for the long-distance terminal 2, since the base station 1 needs to reliably direct a null to the another-station long-distance terminal 2 in the timing for the peripheral base station 1 to transmit a signal to the another-station long-distance terminal 2, the SRS transmission symbol period 370 needs to be associated in one-on-one with the downlink communication period 380.

As opposed to this, as for the short-distance terminal 2, even when the base station 1 transmits a signal to the short-distance terminal 2, the signal is not apt to reach the communication terminal 2 communicating with the peripheral base station 1, and hence, even when a null is not directed to the communication terminal 2 communicating with the peripheral base station 1 at the time of a signal being transmitted to the short-distance terminal 2 in the base station 1, it is not so problematical. Therefore, as in the above embodiment, not to mention a case where the base station 1 does not perform null-steering at the time of transmitting a signal to the short-distance terminal 2, even in a case where it performs null-steering, it is possible to transmit a signal to the short-distance terminal 2 in any of a plurality of downlink communication periods 380 after the SRS transmission symbol period 370 in which the SRS0 is received from the short-distance terminal 2, as foregoing FIGS. 19 and 20. This leads to improvement in degree of flexibility in allocation of the downlink communication period 380 to the short-distance terminal 2 in the radio resource allocating unit 122.

It is to be noted that as in the example of FIG. 13, even when the SRS transmission symbol period 370 is associated in one-on-one with the downlink communication period 380 in relation to the short-distance terminal 2, by transmitting a new SRS control signal to direct the short-distance terminal 2 that transmits the SRS0 in the first SRS transmission symbol period 370a to transmit the SRS0 in the second SRS transmission symbol period 370b, it is possible to transmit a signal to the short-distance terminal 2 both in the first downlink communication period 380a and the second downlink communication period 380b, as in FIG. 19. However, this is not preferable because until a new SRS control signal is transmitted to the short-distance terminal 2 and the short-distance terminal 2 transmits the SRS0 based on the new SRS control signal, since the time not shorter than one frame is required as shown in FIG. 8 it thus causes a decrease in transmission throughput.

Second Modified Example Differently from the foregoing embodiment, in each base station 1, at the time of transmitting a signal to the long-distance terminal 2 in the downlink communication period 380 of one SRS transmission period 360, when a signal is transmitted in a transmission frequency band not included in the transmission frequency band of the SRS1 from the long-distance terminal 2 which is transmitted in that one SRS transmission period 360, each base station 1 cannot direct a null to the another-station long-distance terminal 2 in the frequency band of a signal to be transmitted by the peripheral base station 1 to the another-station long-distance terminal 2.

For example, as shown in FIG. 21, a case will be considered where the peripheral base station 1 transmits, to the another-station long-distance terminal 2, a signal in the frequency band not included in the transmission frequency band of the SRS1 received from the another-station long-distance terminal 2, and the base station 1 transmits, to the own-station long-distance terminal 2, a signal in the frequency band included in the transmission frequency band of the SRS1 received from the own-station long-distance terminal 2. In the example of FIG. 21, the transmission frequency band of the SRS1 from the another-station long-distance terminal 2 coincides with the transmission frequency band of the SRS1 from the own-station long-distance terminal 2.

In this case, since the base station 1 receives the SRS1 from the own-station long-distance terminal 2, having suffered interference from the SRS1 from the another-station long-distance terminal 2, it can direct a null to the another-station long-distance terminal 2 within the transmission frequency band of the SRS1, but cannot direct a null to the another-station long-distance terminal 2 beyond the transmission frequency band of the SRS1. In the example of FIG. 21, since the frequency band of a transmitted signal to the another-station long-distance terminal 2 is beyond the transmission frequency band of the SRS1, the base station 1 cannot direct a null to the another-station long-distance terminal 2 in the frequency band of the transmitted signal to the another-station long-distance terminal 2. Therefore, as in the foregoing embodiment, in each base station 1, at the time of transmitting a signal to the long-distance terminal 2 in the downlink communication period 380 of one SRS transmission period 360, it is necessary to transmit a signal in the frequency band included in the transmission frequency band of the SRS1 from the long-distance terminal 2 which is transmitted in that one SRS transmission period 360.

As opposed to this, as described above, it is not so problematical even when a null is not directed to the communication terminal 2 communicating with the base station 1 at the time of a signal being transmitted to the short-distance terminal 2 in the base station 1. Therefore, not only in a case where the base station 1 does not perform null-steering at the time of transmitting a signal to the short-distance terminal 2, but also even in a case where the base station 1 performs null-steering, it is not so much of a problem that each base station 1 transmits a signal in the frequency band not included in the transmission frequency band of the SRS0 received from the short-distance terminal 2 in one SRS transmission period 360, to the short-distance terminal 2 in that one SRS transmission period 360.

Thereat, in the present modified example, in each base station 1, at the time of transmitting a signal to the short-distance terminal 2 in the downlink communication period 380 included in one SRS transmission period 360, a signal is transmittable in the frequency band not included in the transmission frequency band of the SRS0 that is transmitted from the short-distance terminal 2 in that one SRS transmission period 360.

Figure 22:
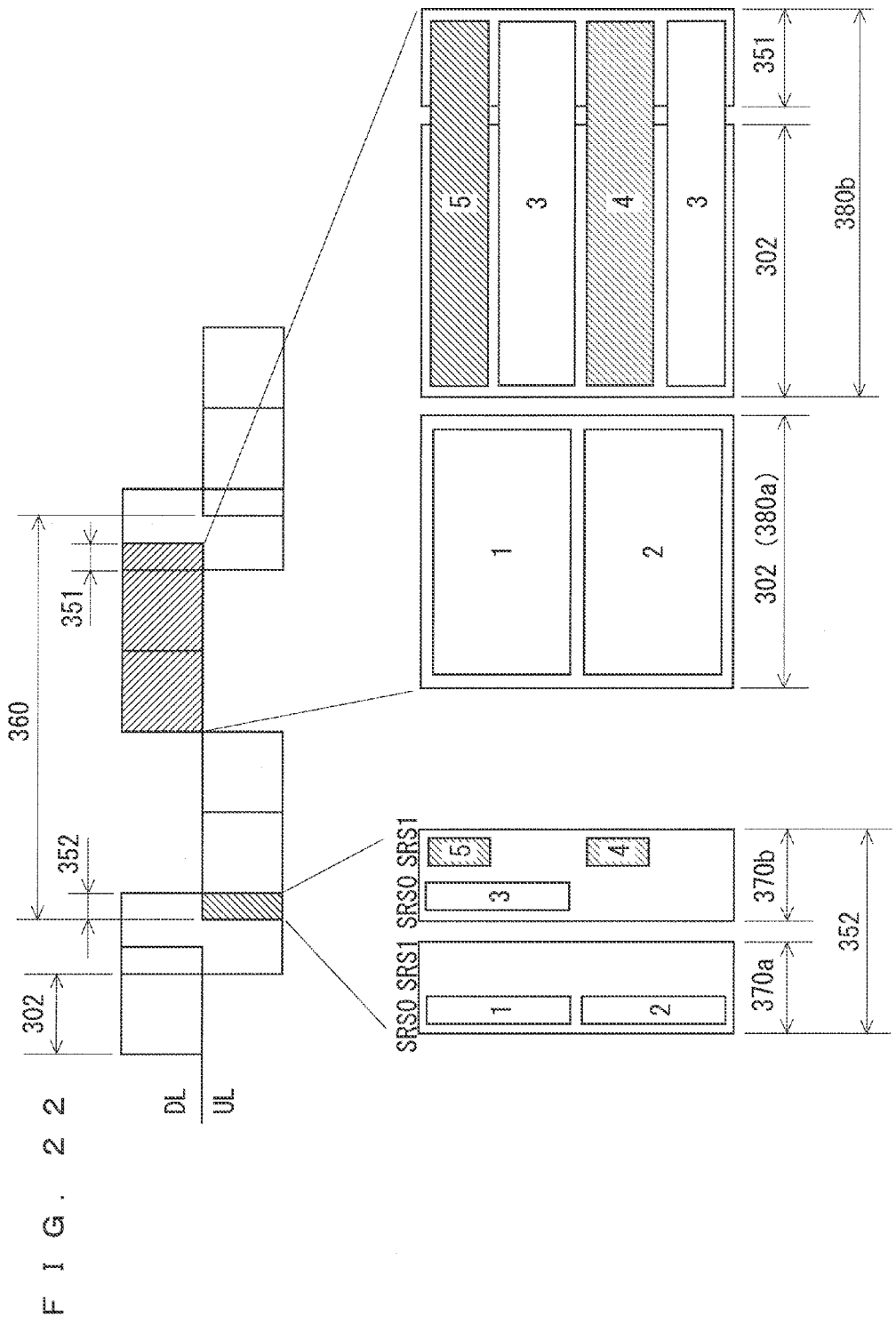
FIG. 22 is a diagram showing an example of allocating the downlink radio resource to the communication terminal.

FIG. 22 is a diagram showing an example of allocating the downlink radio resource to the communication terminal 2 in the present modified example. In the example of FIG. 22, in the second downlink communication period 380b included in one SRS transmission period 360, at the time of transmitting a signal to the short-distance terminal 2 of the terminal No. 3, the base station 1 transmits a transmitted signal in the frequency band included in the transmission frequency band of SRS0 transmitted from the short-distance terminal 2 in that one SRS transmission period 360 and a transmitted signal in the frequency band not included in the transmission frequency band. This leads to improvement in transmission throughput with respect to the short-distance terminal 2 of the terminal No. 3 as compared with the example of FIG. 13.

In the base station 1, at the time of transmitting a transmitted signal in the frequency band not included in the transmission frequency band of the SRS0 received from the subject communication terminal 2 to the subject communication terminal 2 in one SRS transmission period 360, beam-forming is performed based on the SRS0 that is received from the subject communication terminal 2 in another SRS transmission period 360 before that one SRS transmission period 360, as well as the SRS0 that includes the frequency band of the transmitted signal in the transmission frequency band. Specifically, beam-forming is performed based on a plurality of complex symbols transmitted using the frequency band of the transmitted signal out of a plurality of complex symbols constituting the SRS0 that includes the frequency band of the transmitted signal in the transmission frequency band.

It is to be noted that as for the SRS transmission band, since frequency hopping as shown in FIG. 6 above is performed, even in a case as in the present example where a transmitted signal in the frequency band not included in the transmission frequency band of the SRS0 that is transmitted in one SRS transmission period 360 is transmitted in that one SRS transmission period 360, the SRS0 that includes the frequency band of the transmitted signal in the transmission frequency band exists in the SRS0 transmitted in another SRS transmission period 360 before that one SRS transmission period 360. Hence it is possible to perform beam-forming at the time of transmitting in one SRS transmission period 360 a transmitted signal in the frequency band not included in the transmission frequency band of the SRS0 that is transmitted in that one SRS transmission period 360.

Figure 23:
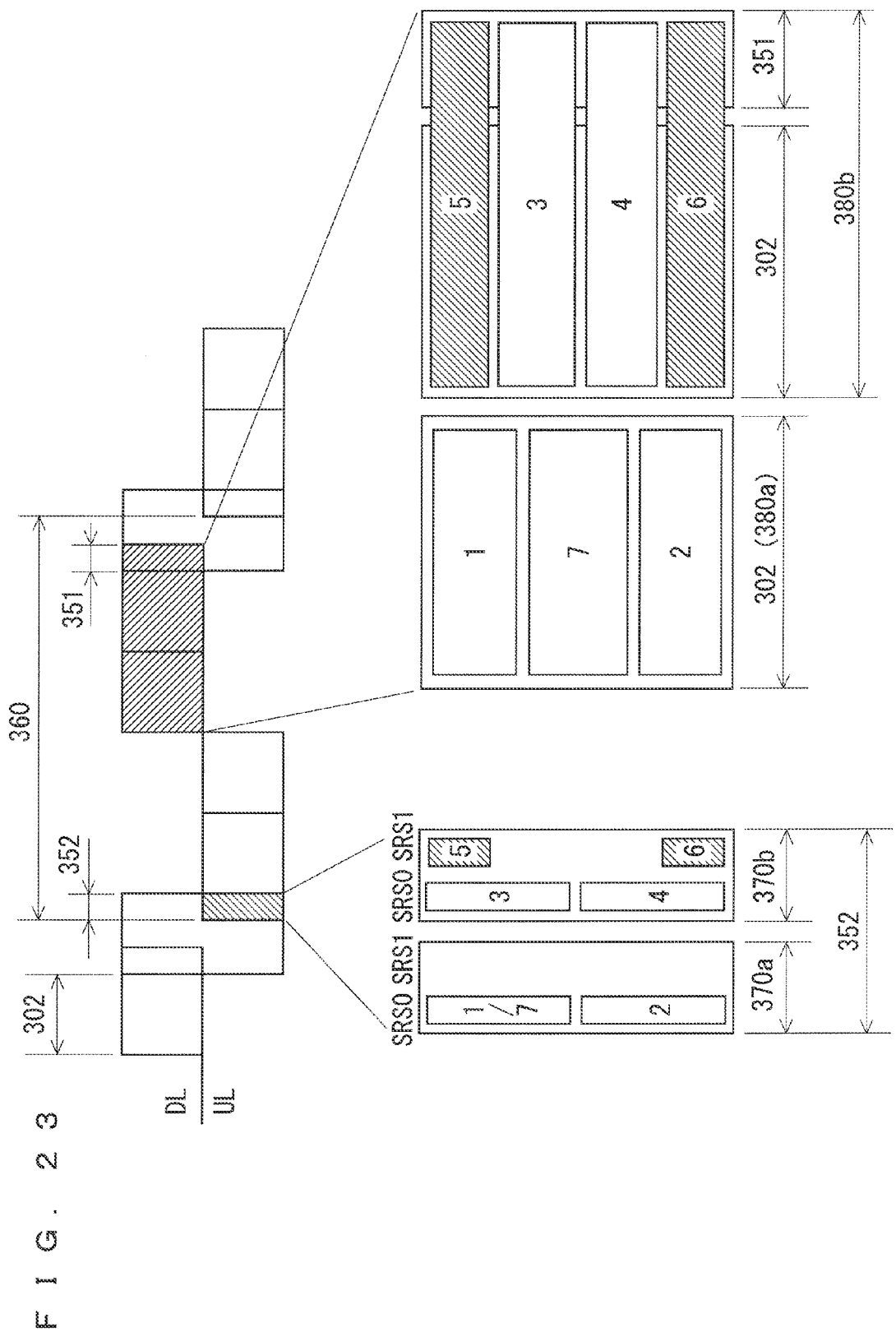
FIG. 23 is a diagram showing an example of allocating the downlink radio resource to the communication terminal.

FIG. 23 is a diagram showing an example of allocating the downlink radio resource to the communication terminal 2 in the present modified example. In the example of FIG. 23, code sequences being orthogonal to one another have been adopted to a code pattern of the SRS0 transmitted by the short-distance terminal 2 of the terminal No. 1 and a code pattern of the SRS0 transmitted by the short-distance terminal 2 of the terminal No. 7, and the two SRS0 have been multiplexed in the same transmission frequency band. Further, in the example of FIG. 23, in the first downlink communication period 380a included in one SRS transmission period 360, at the time of transmitting a signal to the short-distance terminal 2 of the terminal No. 7, the base station 1 transmits a transmitted signal in the frequency band included in the transmission frequency band of SRS0 transmitted from the short-distance terminal 2 in that one SRS transmission period 360 and a transmitted signal in the frequency band not included in the transmission frequency band.

As thus described, at the time of transmitting a signal to the short-distance terminal 2 in the downlink communication period 380 that is included in one SRS transmission period 360, a signal in the frequency band not included in the transmission frequency band of the SRS0 that is transmitted from the short-distance terminal 2 in that one SRS transmission period 360 is made transmittable, thereby leading to improvement in degree of flexibility in allocation of the frequency band for use in the downlink communication, to the short-distance terminal 2 in the radio resource allocating unit 122.

It is to be noted that in each SRS transmission period 360, even in the case of transmitting only a transmitted signal in the frequency band included in the transmission frequency band of SRS0 that is transmitted by the short-distance terminal 2 to the short-distance terminal 2, a new SRS control signal is transmitted which directs the short-distance terminal 2 to increase the transmission frequency band of the SRS0, thereby allowing transmission of the transmitted signal in a wide frequency band to the short-distance terminal 2. This can result in improvement in transmission throughput with respect to the short-distance terminal 2 as in the short-distance terminal 2 of the terminal No. 3 in the example of FIG. 21. However, due to the need for the time not shorter than one frame until a new SRS control signal is transmitted to the short-distance terminal 2 and the short-distance terminal 2 transmits the SRS0 based on the new SRS control signal, the effect of improvement in transmission throughput thus decreases, which is not preferred.

Third Modified Example

Figure 24:
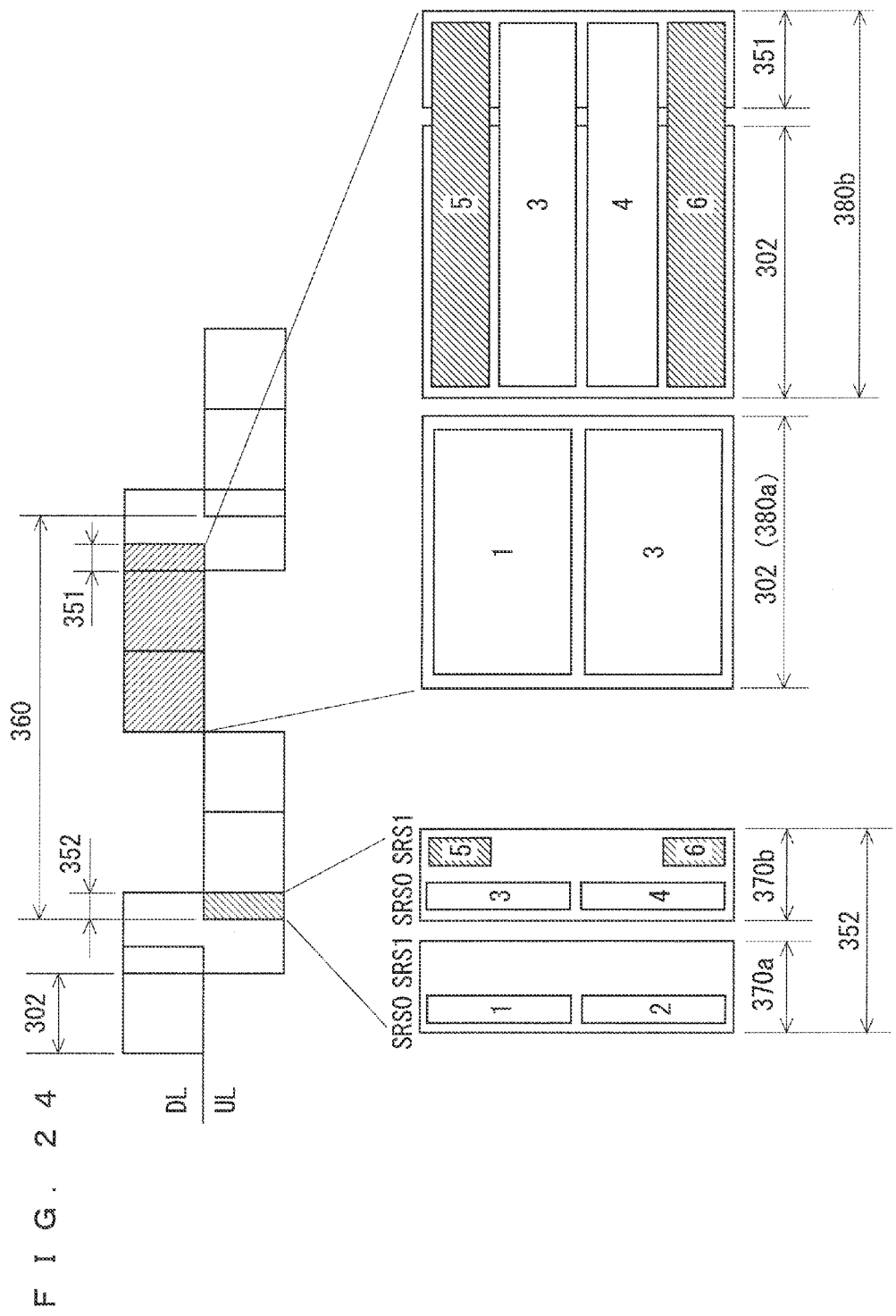
FIG. 24 is a diagram showing an example of allocating the downlink radio resource to the communication terminal.
Figure 25:
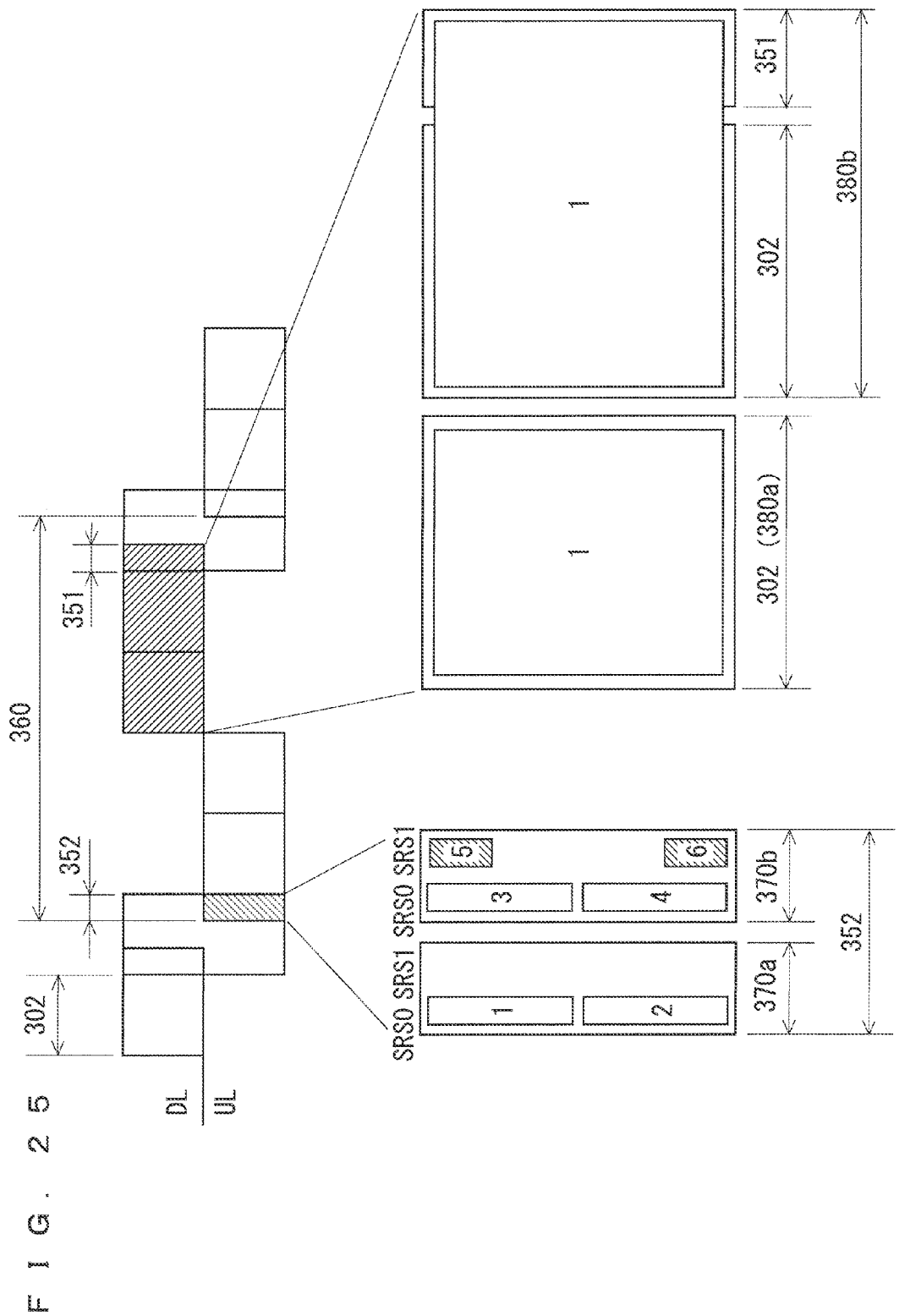
FIG. 25 is a diagram showing an example of allocating the downlink radio resource to the communication terminal.

FIGS. 24 to 26 are diagrams showing examples of allocating the downlink radio resource to the communication terminal 2 at the time of combining the first and second modified examples.

In the example of FIG. 24, the base station 1 transmits a signal to the short-distance terminal 2 of the terminal No. 3 that transmits the SRS0 in the second SRS transmission symbol period 370b, by use of not only the second downlink communication period 380b but also the first downlink communication period 380a. Further, at the time of transmitting a signal to the short-distance terminal 2 of the terminal No. 3 in the first downlink communication period 380a, the base station 1 transmits a signal in the frequency band not included in the transmission frequency band of the SRS0 that is transmitted from the short-distance terminal 2 in the SRS transmission period 360 including the first downlink communication period 380a.

In the example of FIG. 25, the base station 1 receives SRSs from the communication terminals 2 of terminal No. 1 to terminal No. 6 in one SRS transmission period 360, but transmits a signal only to the communication terminal 2 of the terminal No. 1. Specifically, using both the first downlink communication period 380a and the second downlink communication period 380b, the base station 1 transmits a signal to the short-distance terminal 2 of the terminal No. 1 that transmits the SRS0 in the first SRS transmission symbol period 370b. Further, at the time of transmitting a signal to the short-distance terminal 2 of the terminal No. 1 in each downlink communication period 380, the base station 1 transmits a signal in the frequency band included in the transmission frequency band of the SRS0 that is transmitted from the short-distance terminal 2 in the SRS transmission period 360 including the downlink communication period 380 and a signal in the frequency band not included in the transmission frequency band. In one SRS transmission period 360, by allocating the downlink radio resource to the communication terminal 2 of the terminal No. 1 as in FIG. 25, the transmission throughput with respect to the communication terminal 2 of the terminal No. 1 gets maximum in that one SRS transmission period 360.

In the example of FIG. 26, the base station 1 transmits a signal in a plurality of symbol periods 304 of the downlink subframe 302 out of the second downlink communication period 380b to the long-distance terminals 2 of the terminal No. 5 and No. 6 that transmit the SRS1 in the second SRS transmission symbol period 370b. Further, using the first downlink communication period 380a, the plurality of symbol periods 304 of the downlink subframe 302 out of the second downlink communication period 380b and the downlink pilot time slot 351 out of the second downlink communication period 380b, the base station 1 transmits a signal to the short-distance terminal 2 of the terminal No. 1 that transmits the SRS0 in the first SRS transmission symbol period 370a. At the time of transmitting a signal to the short-distance terminal 2 of the terminal No. 1 in the each downlink communication period 380, the base station 1 transmits a signal in the frequency band included in the transmission frequency band of the SRS0 that is transmitted from the short-distance terminal 2 in the SRS transmission period 360 including the downlink communication period 380 and a signal in the frequency band not included in the transmission frequency band.

Although the case of applying the present invention to LTE is described in the foregoing embodiment and modified examples thereof, the present invention can be applied to another communication system.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS 1, 1a base station
1b peripheral base station
2 communication terminal
2a own-station long-distance terminal
2b to 2d own-station short-distance terminal
2e another-station long-distance terminal
2f another-station short-distance terminal
13 communication unit
125 terminal specification unit
100 communication system
110a antenna
370a first SRS transmission symbol period
370b second SRS transmission symbol period
380a first downlink communication period
380b second downlink communication period
450 SRS transmission band
500a, 500b beam
501a, 501b null

The invention claimed is:
1. A base station in a communication system provided with a plurality of base stations, comprising:

a communication unit for communicating with a communication terminal by use of a plurality of antennas; and a generation unit for generating a signal transmitted from the communication unit, wherein a first reference signal and a second reference signal are to be transmitted by the communication terminal in the communication system, wherein a plurality of carriers for use in transmission of the first reference signal are alternately arranged with a plurality of carriers for use in transmission of the second reference signal in the same transmission frequency band, wherein at the time of transmitting a signal to a communication terminal that transmits the first reference signal, the communication unit performs null-steering in relation to transmission directivity at the plurality of antennas based on the first reference signal from the communication terminal, wherein the base station further comprises a decision unit for deciding which one between the first reference signal or the second reference signal is to be transmitted by the communication terminal based on a signal from the communication terminal which is received in the communication unit, and wherein the communication unit notifies the communication terminal, to which the decision unit decides to transmit the first reference signal, that the communication terminal transmits the first reference signal, and notifies the communication terminal, to which the decision unit decides to transmit the second reference signal, that the communication terminal transmits the second reference signal.

2. The base station according to claim 1, wherein the decision unit decides which one between the first reference signal or the second reference signal is to be transmitted by the communication terminal based on received electric power of a signal from the communication terminal.

3. The base station according to claim 1, wherein the decision unit decides which one between the first reference signal or the second reference signal is to be transmitted by the communication terminal based on an amount of deviation of reception timing for a signal from the communication terminal.

4. The base station according to claim 1, wherein the decision unit decides which one between the first reference signal or the second reference signal is to be transmitted by the communication terminal based on positional information concerning the communication terminal, from the communication terminal.

5. The base station according to claim 1, wherein the decision unit decides which one between the first reference signal or the second reference signal is to be transmitted by the communication terminal based on reception quality information in the communication terminal, from the communication terminal.

6. The base station according to claim 1, further comprising:

a specification unit for specifying a long-distance terminal which is a communication terminal that communicates with its base station and exists in a position at least a predetermined distance from its base station, wherein in the base station, when the communication unit transmits a signal, to the long-distance terminal that transmits the first reference signal and is specified in the specification unit, with performing null-steering in relation to transmission directivity at the plurality of antennas, a null is directed to a communication terminal that communicates with a peripheral base station and exists in a position distant from the peripheral base station, and a null is not directed to a communication terminal that communicates with a peripheral base station and exists in a position closer to the peripheral base station than the predetermined distance.

7. A base station in a communication system provided with a plurality of base stations, comprising:

a communication unit for communicating with a communication terminal by use of a plurality of antennas; and a generation unit for generating a signal transmitted from the communication unit, wherein a first reference signal and a second reference signal are to be transmitted by the communication terminal in the communication system, wherein a plurality of carriers for use in transmission of the first reference signal are alternately arranged with a plurality of carriers for use in transmission of the second reference signal in the same transmission frequency band, wherein at the time of transmitting a signal to a communication terminal that transmits the first reference signal, the communication unit performs null-steering in relation to transmission directivity at the plurality of antennas based on the first reference signal from the communication terminal, wherein the base station further comprises a decision unit for deciding that a communication terminal that exists in a position distant from the base station should transmit the first reference signal, and deciding that a communication terminal that exists in a position close to the base station should transmit the second reference signal, wherein the communication unit notifies the communication terminal, to which the decision unit decides to transmit the first reference signal, that the communication terminal transmits the first reference signal, and notifies the communication terminal, to which the decision unit decides to transmit the second reference signal, that the communication terminal transmits the second reference signal, and wherein a transmission frequency bandwidth of the first reference signal is set smaller than a transmission frequency bandwidth of the second reference signal.

8. The base station according to claim 7, wherein at the time of transmitting a signal to a communication terminal which transmits the second reference signal, the communication unit performs beam-forming in relation to transmission directivity at the plurality of antennas based on the second reference signal from the communication terminal such that a beam is directed to the communication terminal.

9. The base station according to claim 8, wherein the communication unit can transmit a signal, only in a specific downlink communication period out of a plurality of downlink communication periods after an uplink communication period in which the communication unit receives the first and second reference signals, to the communication terminal that transmits the first reference signal, and can transmit a signal, in any of the plurality of downlink communication periods, to the communication terminal that transmits the second reference signal.

10. The base station according to claim 8, wherein a transmission period of the first and second reference signals is defined, at the time of transmitting a signal to a communication terminal that transmits the first reference signal in the downlink period included in one transmission period, the communication unit can transmit a signal having a frequency band included in a transmission frequency band of the first reference signal transmitted in the one transmission period, and at the time of transmitting a signal to a communication terminal that transmits the second reference signal in the downlink period included in one transmission period, the communication unit can transmit a signal having a frequency band not included in a transmission frequency band of the second reference signal transmitted in the one transmission period.

11. A control method for transmission directivity at one base station in a communication system provided with a plurality of base stations, the method comprising the steps of:

(a) communicating with a communication terminal by use of a plurality of antennas; and (b) generating a signal transmitted in the step (a), wherein a first reference signal and a second reference signal are to be transmitted by the communication terminal in the communication system, wherein a plurality of carriers for use in transmission of the first reference signal are alternately arranged with a plurality of carriers for use in transmission of the second reference signal in the same transmission frequency band, wherein, in the step (a), at the time of transmitting a signal to a communication terminal that transmits the first reference signal, null-steering is performed in relation to transmission directivity at the plurality of antennas based on the first reference signal from the communication terminal, wherein the method further comprises deciding which one between the first reference signal and the second reference signal is to be transmitted by the communication terminal based on a signal received from the communication terminal, when the decision is the first reference signal, notifying the communication terminal that the communication terminal transmits the first reference signal, and, when the decision is the second reference signal, notifying the communication terminal that the communication terminal transmits the second reference signal.

12. The control method for transmission directivity at a base station according to claim 11, the method further comprising the step of:

(c) specifying a long-distance terminal which is a communication terminal that communicates with its base station and exists in a position at least a predetermined distance from its base station, wherein in the step (a), when a signal is transmitted, to the long-distance terminal that transmits the first reference signal and is specified in the step (c), with null-steering being performed in relation to transmission directivity at the plurality of antennas, a null is directed to a communication terminal that communicates with a peripheral base station and exists in a position distant from the peripheral base station, and a null is not directed to a communication terminal that communicates with a peripheral base station and exists in a position closer to the peripheral base station than the predetermined distance.

\* \* \* \* \*